(12) United States Patent
Coscarella

(10) Patent No.: US 12,081,005 B2
(45) Date of Patent: Sep. 3, 2024

(54) WEATHERPROOF ENCLOSURE FOR JUNCTION BOX

(71) Applicant: Gabe Coscarella, Edmonton (CA)

(72) Inventor: Gabe Coscarella, Edmonton (CA)

(\*) Notice: Subject to any disclaimer, the term of this patent is extended or adjusted under 35 U.S.C. 154(b) by 0 days.

(21) Appl. No.: 16/706,135

(22) Filed: Dec. 6, 2019

(65) Prior Publication Data

US 2020/0185896 A1 Jun. 11, 2020

Related U.S. Application Data

(60) Provisional application No. 62/776,952, filed on Dec. 7, 2018.

(51) Int. Cl.
*H02G 3/08* (2006.01)
(52) U.S. Cl.
CPC .................... *H02G 3/088* (2013.01)
(58) Field of Classification Search
CPC ...................................... H02G 3/088
USPC ......................................... 174/500
See application file for complete search history.

(56) References Cited

U.S. PATENT DOCUMENTS

| | | |
|---|---|---|
| 1,249,892 A | 12/1917 | Bropson |
| 2,407,023 A | 9/1946 | Lockwood |
| 2,670,976 A | 3/1954 | Owen |
| 3,591,190 A | 7/1971 | Winay et al. |
| 3,787,061 A | 1/1974 | Yoakum |
| 3,788,655 A | 1/1974 | Hathaway |
| 3,809,350 A | 5/1974 | Lane |
| 3,881,752 A | 5/1975 | Fujishima |
| 3,913,928 A | 10/1975 | Yamaguchi |
| 4,087,624 A * | 5/1978 | Hitchcock ............ A62C 3/16 169/48 |
| 4,162,347 A | 7/1979 | Montgomery |
| 4,265,058 A | 5/1981 | Logsdon |
| 4,293,138 A | 10/1981 | Swantee |
| 4,296,870 A * | 10/1981 | Balkwill ............ H02G 3/088 174/57 |
| 4,350,351 A | 9/1982 | Martin |
| 4,385,777 A | 5/1983 | Logsdon |
| D269,454 S | 6/1983 | Houseman |

(Continued)

FOREIGN PATENT DOCUMENTS

| | | |
|---|---|---|
| CA | 2452668 A1 | 3/2005 |
| CA | 2841366 A1 | 8/2015 |

(Continued)

*Primary Examiner* — Stanley Tso
(74) *Attorney, Agent, or Firm* — CHRISTENSEN O'CONNOR JOHNSON KINDNESS PLLC

(57) ABSTRACT

A combination of a junction box, a cover plate, and a weather barrier is provided. The junction box has a sidewall, an open end, and a closed end. The cover plate is removably connected to the junction box, and is sized to cover the open end of the junction box. The weather barrier has a non-permeable sheet with a wall cover portion that surrounds a flange that defines a junction box receiving area. The flange protrudes from a first face of the wall cover portion and terminates in a top peripheral edge. The junction box is positioned within the junction box receiving area, the flange surrounds the junction box, and the top peripheral edge extends toward the open end of the junction box. The cover plate engages and forms a seal with the top peripheral edge of the flange when the cover plate is connected to the junction box.

12 Claims, 31 Drawing Sheets

(56) References Cited

U.S. PATENT DOCUMENTS

| | | |
|---|---|---|
| 4,386,488 A | 6/1983 | Gibbs |
| 4,482,161 A | 11/1984 | Izzi, Sr. |
| 4,526,407 A | 7/1985 | Kifer |
| 4,548,853 A | 10/1985 | Bryan |
| 4,563,847 A | 1/1986 | Hasty |
| 4,570,943 A | 2/1986 | Houseman et al. |
| 4,794,207 A | 12/1988 | Norberg |
| 4,903,997 A | 2/1990 | Kifer |
| 4,905,940 A | 3/1990 | Luka |
| 4,927,039 A | 5/1990 | McNab |
| 4,952,754 A | 8/1990 | Rye |
| 5,015,700 A | 4/1991 | Blair |
| 5,133,165 A | 7/1992 | Wimberly |
| 5,226,263 A | 7/1993 | Merrin et al. |
| 5,237,789 A | 8/1993 | Thaler |
| 5,248,154 A | 9/1993 | Westhoff |
| 5,287,665 A | 2/1994 | Rath, Jr. |
| 5,347,776 A | 9/1994 | Skoff |
| 5,501,472 A | 3/1996 | Brancher |
| 5,549,266 A | 4/1996 | Mitchell et al. |
| 5,588,267 A | 12/1996 | Rodriguez et al. |
| 5,667,224 A * | 9/1997 | Streckert ............... F16J 15/52 277/921 |
| 5,807,335 A * | 9/1998 | Kriesel ................. A61M 5/152 604/131 |
| 5,829,214 A | 11/1998 | Hart |
| 5,860,256 A | 1/1999 | Humber |
| 5,944,361 A | 8/1999 | Bravo |
| 5,977,486 A | 11/1999 | Fujita |
| 6,079,751 A | 6/2000 | Youngs |
| 6,161,589 A | 12/2000 | Bolotte et al. |
| 6,185,885 B1 | 2/2001 | Thaler |
| 6,239,365 B1 | 5/2001 | McEvers |
| 6,315,849 B1 | 11/2001 | Ross |
| 6,395,984 B1 | 5/2002 | Gilleran |
| 6,417,447 B1 | 7/2002 | Bosse, Jr. |
| 6,494,463 B1 | 12/2002 | Rank |
| 6,543,186 B2 | 4/2003 | Gilleran |
| 6,588,801 B1 | 7/2003 | Mayle |
| 6,596,938 B2 | 7/2003 | Gilleran |
| 6,649,835 B2 | 11/2003 | Gilleran |
| 6,723,921 B2 | 4/2004 | Vagedes |
| 6,860,070 B2 | 3/2005 | Gilleran |
| 6,862,852 B1 | 3/2005 | Beele |
| 6,891,104 B2 | 5/2005 | Dinh |
| 6,951,081 B2 | 10/2005 | Bonshor |
| 6,979,777 B2 | 12/2005 | Marcou et al. |
| 7,005,578 B2 | 2/2006 | Gretz |
| 7,176,377 B1 | 2/2007 | Gretz |
| 7,192,219 B2 | 3/2007 | Graziosi |
| 7,319,192 B1 | 1/2008 | Gretz |
| 7,410,372 B2 | 8/2008 | Johnson et al. |
| 7,435,900 B1 | 10/2008 | Gretz |
| 7,568,314 B2 | 8/2009 | Collins |
| 7,626,118 B1 | 12/2009 | Capozzi |
| 7,637,385 B2 | 12/2009 | Wegner |
| 7,645,937 B2 | 1/2010 | Bhosale |
| 7,674,974 B1 | 3/2010 | Shotey |
| 7,682,675 B2 | 4/2010 | Boge et al. |
| 7,763,799 B2 | 7/2010 | Johnson |
| 7,789,257 B2 | 9/2010 | Davis |
| 7,802,798 B2 | 9/2010 | Beele |
| 7,875,798 B2 | 1/2011 | Funk et al. |
| 7,880,085 B2 | 2/2011 | Nurenburg et al. |
| 7,918,066 B1 | 4/2011 | Bauer |
| 8,046,955 B2 | 11/2011 | Chan et al. |
| 8,079,599 B2 | 12/2011 | Meyers |
| 8,156,700 B2 | 4/2012 | Umlor |
| 8,490,353 B2 | 7/2013 | Beele |
| 8,530,757 B2 | 9/2013 | Dinh |
| 8,833,014 B2 | 9/2014 | Beele |
| 8,933,331 B1 | 1/2015 | Gretz |
| 9,228,689 B1 | 1/2016 | Cline et al. |
| 9,647,439 B1* | 5/2017 | Gretz ................... H02G 3/0658 |
| 10,490,988 B1* | 11/2019 | Baldwin ............... H02G 3/083 |
| 2001/0052564 A1 | 12/2001 | Karlinger |
| 2002/0179317 A1 | 12/2002 | Hurley |
| 2003/0019163 A1 | 1/2003 | Dittel |
| 2003/0037942 A1 | 2/2003 | Haselby et al. |
| 2003/0052074 A1* | 3/2003 | Chang .................. B65D 51/002 422/400 |
| 2003/0178787 A1 | 9/2003 | Christie et al. |
| 2004/0045233 A1 | 3/2004 | Beele |
| 2005/0017610 A1 | 1/2005 | Mistry et al. |
| 2005/0028456 A1 | 2/2005 | McLane et al. |
| 2005/0042403 A1 | 2/2005 | Boge et al. |
| 2005/0055889 A1 | 3/2005 | Thaler |
| 2006/0027388 A1 | 2/2006 | Collins |
| 2006/0130411 A1 | 6/2006 | Edgar et al. |
| 2007/0245894 A1 | 10/2007 | Poulis |
| 2008/0085336 A1 | 4/2008 | Mayle |
| 2008/0124506 A1 | 5/2008 | Boge et al. |
| 2008/0157518 A1 | 7/2008 | Cecilio |
| 2009/0152820 A1 | 6/2009 | Meyers |
| 2010/0059941 A1 | 3/2010 | Beele |
| 2010/0263311 A1 | 10/2010 | Ryden |
| 2011/0024993 A1 | 2/2011 | Happel et al. |
| 2011/0056743 A1 | 3/2011 | Solan |
| 2011/0266277 A1* | 11/2011 | Garvin ................... H02G 3/086 220/3.2 |
| 2012/0090263 A1 | 4/2012 | Schaefer |
| 2012/0279777 A1 | 11/2012 | Gagne et al. |
| 2013/0231042 A1 | 9/2013 | Coscarella |
| 2013/0234404 A1 | 9/2013 | Coscarella |
| 2013/0264088 A1 | 10/2013 | Dinh |
| 2014/0021688 A1 | 1/2014 | Hattori et al. |
| 2014/0023804 A1* | 1/2014 | Coscarella ............. H02G 3/088 428/34.1 |
| 2014/0159359 A1 | 6/2014 | Beall |
| 2014/0196271 A1 | 7/2014 | Coscarella |
| 2014/0202758 A1 | 7/2014 | Lolachi |
| 2014/0232106 A1 | 8/2014 | Mukai et al. |
| 2014/0260044 A1 | 9/2014 | Gilleran |
| 2015/0075080 A1 | 3/2015 | Ellingson |
| 2015/0076978 A1 | 3/2015 | Ellingson |
| 2015/0085500 A1 | 3/2015 | Cooper et al. |
| 2015/0218798 A1 | 8/2015 | Coscarella |
| 2015/0218799 A1 | 8/2015 | Coscarella |
| 2015/0218828 A1 | 8/2015 | Goddard |
| 2015/0323103 A1 | 11/2015 | Coscarella |
| 2016/0076673 A1 | 3/2016 | Rule et al. |
| 2016/0201325 A1 | 7/2016 | Moore |
| 2016/0258165 A1 | 9/2016 | Walters |
| 2018/0228259 A1* | 8/2018 | Lipner ..................... H04R 7/20 |
| 2021/0203144 A1* | 7/2021 | Akiba ...................... H02G 3/16 |

FOREIGN PATENT DOCUMENTS

| | | |
|---|---|---|
| CA | 2896296 A1 | 1/2017 |
| DE | 4131637 A1 | 4/1992 |
| DE | 29800679 U1 | 7/1998 |
| DE | 202012101447 U1 | 9/2012 |
| DE | 202013100908 U1 | 8/2013 |
| EP | 0161557 A2 | 11/1985 |
| EP | 2703703 A1 | 3/2014 |
| EP | 2063163 B1 | 8/2014 |
| FR | 2567240 A1 | 1/1986 |
| GB | 2216220 B | 11/1992 |
| JP | 2007040610 A | 2/2007 |

* cited by examiner

WEATHERPROOF ENCLOSURE FOR JUNCTION BOX

TECHNICAL FIELD

This relates to the provision of weatherproof barriers on the exterior of buildings, and in particular, to weatherproof enclosures that surround junction boxes that extend out of exterior walls of buildings.

BACKGROUND

Junction boxes are frequently required on the exterior of buildings, with electrical cables and other conduits passing from within the building to the exterior of the building and entering the junction box. In order to ensure that the building is weatherproof and that no moisture is able to travel into the walls through the openings for the junction boxes, weatherproof barriers are provided around junction boxes. The weatherproof barriers can then be connected to building wrap material that weatherproofs the remainder of the building.

SUMMARY

According to an aspect, there is provided in combination a junction box having a sidewall that extends between an open end and a closed end, the sidewall having an inner surface and an outer surface, a cover plate that is removably connected to the junction box, the cover plate being sized to cover the open end of the junction box, and a weather barrier, comprising a sheet made from non-permeable material, the sheet comprising a wall cover portion that surrounds a flange, the flange defining a junction box receiving area, the flange protruding from a first face of the wall cover portion and terminating in a top peripheral edge, wherein the junction box is positioned within the junction box receiving area such that the flange surrounds the junction box and the top peripheral edge extends toward the open end of the junction box, wherein the cover plate engages and forms a seal with the top peripheral edge of the flange when the cover plate is connected to the junction box.

According to other aspects, in a plane parallel to the wall cover portion of the sheet, the junction box receiving area may have a cross-sectional area that is greater than a cross-sectional area of the junction box, the flange may extend past the open end of the junction box, the flange may be made from a deformable material that deforms when the cover plate is installed on the junction box, the cover plate may carry a sealing material that seals against the top peripheral edge of the flange when the cover plate is installed on the junction box, the flange may be continuously and integrally formed with the wall cover portion from the same material, the material of the flange and the wall cover portion having the same material properties, the flange may comprise a double-walled structure, the flange may be corrugated, the junction box receiving area may have a rear wall opposite the top peripheral edge of the flange, the flange may comprise a double-walled structure that has a first end connected to the wall cover portion and a second end connected to a telescoping wall that is positioned within the junction box receiving area, the top peripheral edge may be defined by a fold in the flange, such that, when the junction box is inserted into the junction box receiving area from a rear surface of the wall cover portion toward the top peripheral edge of the flange, the telescoping wall may engage and move with the open end of the junction box, and the combination may further comprise an interior seal positioned within the junction box receiving area, which may comprise an aperture that receives an elongate member, and may sealingly engage the closed end of the junction box and sealing around the elongate member.

According to an aspect, there is provided in combination a junction box having a sidewall that extends between an open end and a closed end, the sidewall having an inner surface and an outer surface, an elongate member that extends into the junction box, a cover plate that is removably connected to the junction box, the cover plate being sized to cover the open end of the junction box, a weather barrier, comprising a sheet made from non-permeable material, the sheet comprising a wall cover portion that surrounds a flange, the flange defining a junction box receiving area, the flange protruding from a first face of the wall cover portion and terminating in a top peripheral edge, wherein the junction box is positioned within the junction box receiving area such that the flange surrounds the junction box and the top peripheral edge extends toward the open end of the junction box, and an interior seal positioned within a perimeter of the flange and comprising an aperture that receives and seals around the elongate member.

According to other aspects, in a plane parallel to the wall cover portion of the sheet, the junction box receiving area may have a cross-sectional area that is greater than a cross-sectional area of the junction box, the interior seal may comprise a deformable material that deforms against the closed end of the junction box when the cover plate is installed on the junction box, the interior seal may comprise a sealing material that seals against the closed end of the junction box when the cover plate is installed on the junction box, the junction box receiving area may have a rear wall opposite the top peripheral edge of the flange, and the interior seal may seal between the closed end of the junction box and the rear wall of the junction box receiving area, the junction box receiving area may have a rear wall opposite the top peripheral edge of the flange, and the interior seal may comprise a protrusion formed in the rear wall, the flange may be continuously and integrally formed with the wall cover portion from the same material, the material of the flange and the wall cover portion having the same material properties, the flange may comprise a double-walled structure, the flange may be corrugated, and the cover plate may engage and form a seal with the top peripheral edge of the flange when the cover plate is connected to the junction box.

According to an aspect, there is provided a method of forming a weatherproof enclosure on the exterior of a wall, the method comprising the steps of forming a hole in the wall for a junction box to pass through, installing a weather barrier within the hole, the weather barrier comprising a sheet made from non-permeable material, the sheet comprising a wall cover portion that surrounds a flange, the flange defining a junction box receiving area, the flange protruding from a first face of the wall cover portion and terminating in a top peripheral edge, installing a j unction box injunction box receiving area, the junction box having a sidewall that extends between an open end and a closed end, the sidewall having an inner surface and an outer surface, the junction box being positioned such that the flange surrounds the junction box and the top peripheral edge extends toward the open end of the junction box, and connecting a cover plate to the junction box, the cover plate being sized to cover the open end of the junction box, such that the cover plate engages and forms a seal with the top peripheral edge of the flange when the cover plate is connected to the junction box.

According to other aspects, the method may further comprise the step of attaching the wall cover portion to a building wrap material, in a plane parallel to the wall cover portion of the sheet, the junction box receiving area may have a cross-sectional area that is greater than a cross-sectional area of the junction box, the flange may extend past the open end of the junction box, the flange may be made from a deformable material, and connecting the cover plate to the junction box may comprise deforming the flange, deforming the flange may form the seal with the top peripheral edge of the flange and the cover plate, the cover plate may carry a sealing material, and connecting the cover plate to the junction box may comprise sealing the sealing material against the top peripheral edge of the flange, the flange may be continuously and integrally formed with the wall cover portion from the same material, the material of the flange and the wall cover portion having the same material properties, the flange may comprise a double-walled structure, the flange may be corrugated, the junction box receiving area may have a rear wall opposite the top peripheral edge of the flange, the flange may comprise a double-walled structure that has a first end connected to the wall cover portion and a second end connected to a telescoping wall that is positioned within the junction box receiving area, the top peripheral edge may be defined by a fold in the flange, such that, installing the junction box in the junction box receiving area may comprise inserting the junction box into the junction box receiving area from a rear surface of the wall cover portion toward the top peripheral edge of the flange, such that the telescoping wall may engage and move with the open end of the junction box, and the method may further comprise the step of positioning an interior seal within the junction box receiving area, the interior seal may comprise an aperture that receives an elongate member, and the interior seal may sealingly engage the closed end of the junction box and seal around the elongate member.

According to an aspect, there is provided a method of forming a weatherproof enclosure on the exterior of a wall, the method comprising the steps of forming a hole in the wall, installing a weather barrier on the exterior of the wall adjacent to the hole, the weather barrier comprising a sheet made from non-permeable material, the sheet comprising a wall cover portion that defines a junction box receiving area, the junction box receiving area comprising an aperture aligned with the hole in the wall, securing a junction box to the wall such that the junction box is positioned within the junction box receiving area, the junction box having a sidewall that extends between an open end and a closed end, the sidewall having an inner surface and an outer surface, passing an elongate member through the hole in the wall and the aperture to extend into the junction box, positioning a seal within the junction box receiving area to prevent fluid from entering the aperture, and connecting a cover plate to the junction box, the cover plate being sized to cover the open end of the junction box.

According to other aspects, the method may further comprise the step of attaching the wall cover portion to a building wrap material, in a plane parallel to the wall cover portion of the sheet, the junction box receiving area may have a cross-sectional area that is greater than a cross-sectional area of the junction box, the interior seal may comprise a deformable material that deforms against the closed end of the junction box when the cover plate is installed on the junction box, the interior seal may comprise a sealing material that seals against the closed end of the junction box when the cover plate is installed on the junction box, the junction box receiving area may have a rear wall, and the interior seal may seal between the closed end of the junction box and the rear wall of the junction box receiving area, the junction box receiving area may have a rear wall, and the interior seal may comprise a protrusion formed in the rear wall, and connecting the cover plate to the junction box may causes the cover plate to engage and form a seal with the weather barrier.

According to an aspect, there is provided, in combination, a junction box having a sidewall that extends between an open end and a closed end, the sidewall having an inner surface and an outer surface, an elongate member that extends into the junction box, a cover plate that is removably connected to the junction box, the cover plate being sized to cover the open end of the junction box, a weather barrier, comprising a sheet made from non-permeable material, the sheet comprising a wall cover portion that surrounds a cavity, the cavity defining a junction box receiving area comprising a rear wall, a sidewall, and an aperture, the cavity being recessed from a first face of the wall cover portion and terminating at the rear wall, wherein the junction box is positioned within the junction box receiving area such that the sidewall surrounds at least a portion of the junction box, and wherein the aperture receives the elongate member, and a seal positioned within a perimeter of the cavity and sealed against fluid entering the aperture.

According to other aspects, the seal may seal between the junction box and the cavity, and the seal may seal between the elongate member and the cavity.

According to an aspect, there is provided, in combination a junction box having a sidewall that extends between an open end and a closed end, the sidewall having an inner surface and an outer surface, an elongate member that extends into the junction box, a cover plate that is removably connected to the junction box, the cover plate being sized to cover the open end of the junction box, a weather barrier, comprising a sheet made from non-permeable material, the sheet comprising a wall cover portion that surrounds a flange, the flange protruding from the wall cover portion, the flange defining and surrounding a junction box receiving area, the junction box receiving area comprising an aperture that receives the elongate member, wherein the junction box is positioned within the junction box receiving area, and an interior seal positioned within a perimeter of the flange, the interior seal sealing between the junction box and the weather barrier.

According to an aspect, there is provided, in combination a junction box having a sidewall that extends between an open end and a closed end, the sidewall having an inner surface and an outer surface, and a weather barrier, comprising a sheet made from non-permeable material, the sheet comprising a wall cover portion that surrounds a flange, wherein the flange defines a junction box receiving area, the flange protruding from a first face of the wall cover portion and terminating in a top peripheral edge, the junction box is positioned within the junction box receiving area such that the flange surrounds the junction box and the top peripheral edge extends toward the open end of the junction box, and the flange comprises a double-walled structure that has a first end connected to the wall cover portion and a second end connected to a telescoping wall that is positioned within the junction box receiving area, the top peripheral edge being defined by a fold in the flange, such that, when the junction box is inserted into the junction box receiving area from a rear surface of the wall cover portion toward the top peripheral edge of the flange, the telescoping wall engages and moves with the open end of the junction box.

According to an aspect, there is provided a method of forming a weatherproof enclosure on the exterior of a wall, the method comprising the steps of forming a hole in the wall, installing a weather barrier on the exterior of the wall adjacent to the hole, the weather barrier comprising, a sheet made from non-permeable material, the sheet comprising a wall cover portion that surrounds a flange, wherein the flange defines a junction box receiving area, the flange protruding from a first face of the wall cover portion and terminating in a top peripheral edge, and the flange comprises a double-walled structure that has a first end connected to the wall cover portion and a second end connected to a telescoping wall that is positioned within the junction box receiving area, the top peripheral edge being defined by a fold in the flange, positioning a junction box within the junction box receiving area of the flange such that the flange surrounds the junction box and the top peripheral edge extends toward the open end of the junction box, the junction box having a sidewall that extends between an open end and a closed end, the sidewall having an inner surface and an outer surface, inserting the junction box into the junction box receiving area such that the telescoping wall engages and moves with the open end of the junction box and a rear surface of the wall cover portion moves toward the top peripheral edge of the flange, and securing the junction box to the wall.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Figure 1:
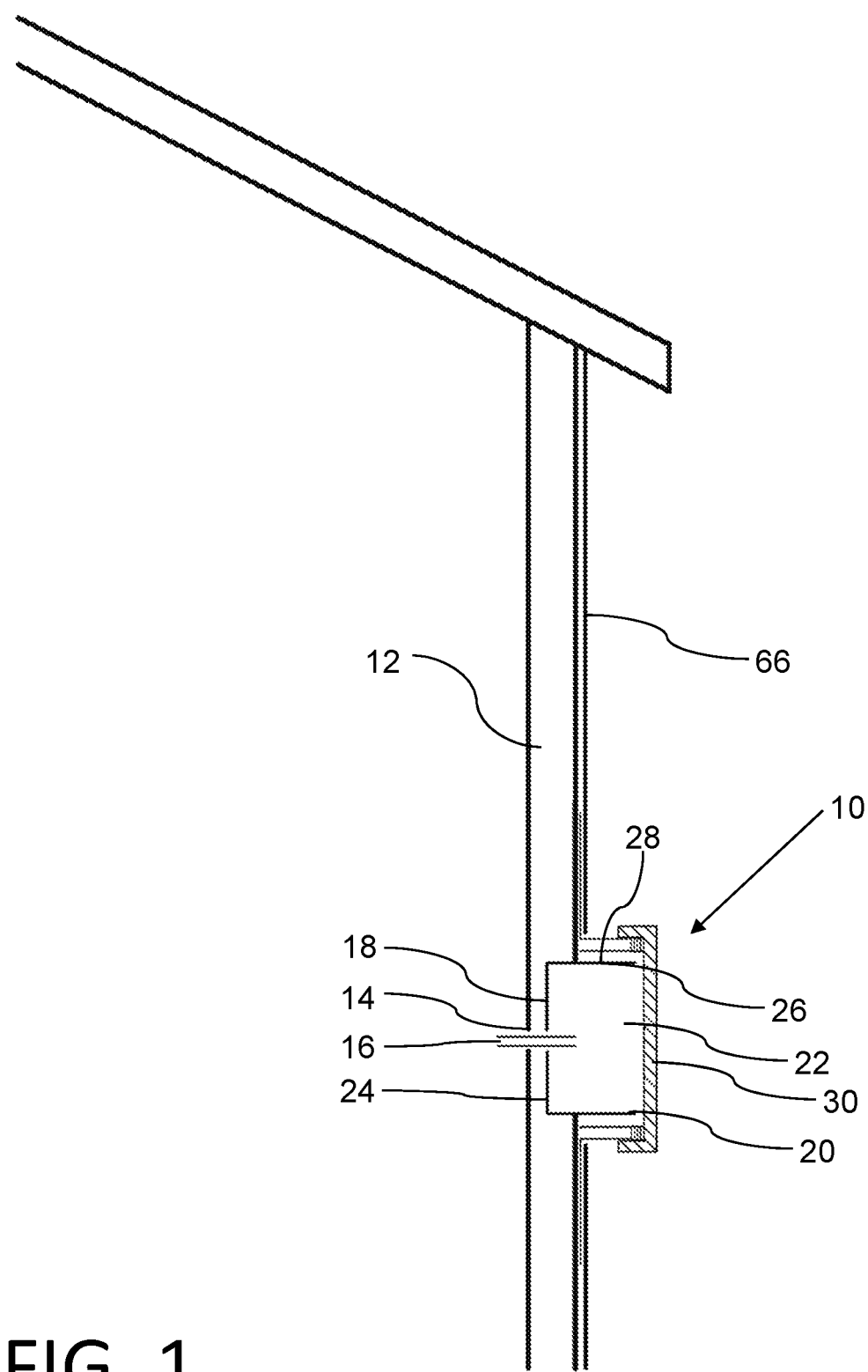
FIG. 1 is a side elevation view in cross section of a weatherproof enclosure for a junction box installed in an exterior wall of a building.

A weatherproof enclosure for a junction box, generally identified by reference numeral 10, will now be described with reference to FIG. 1 through 31.

Figure 2:
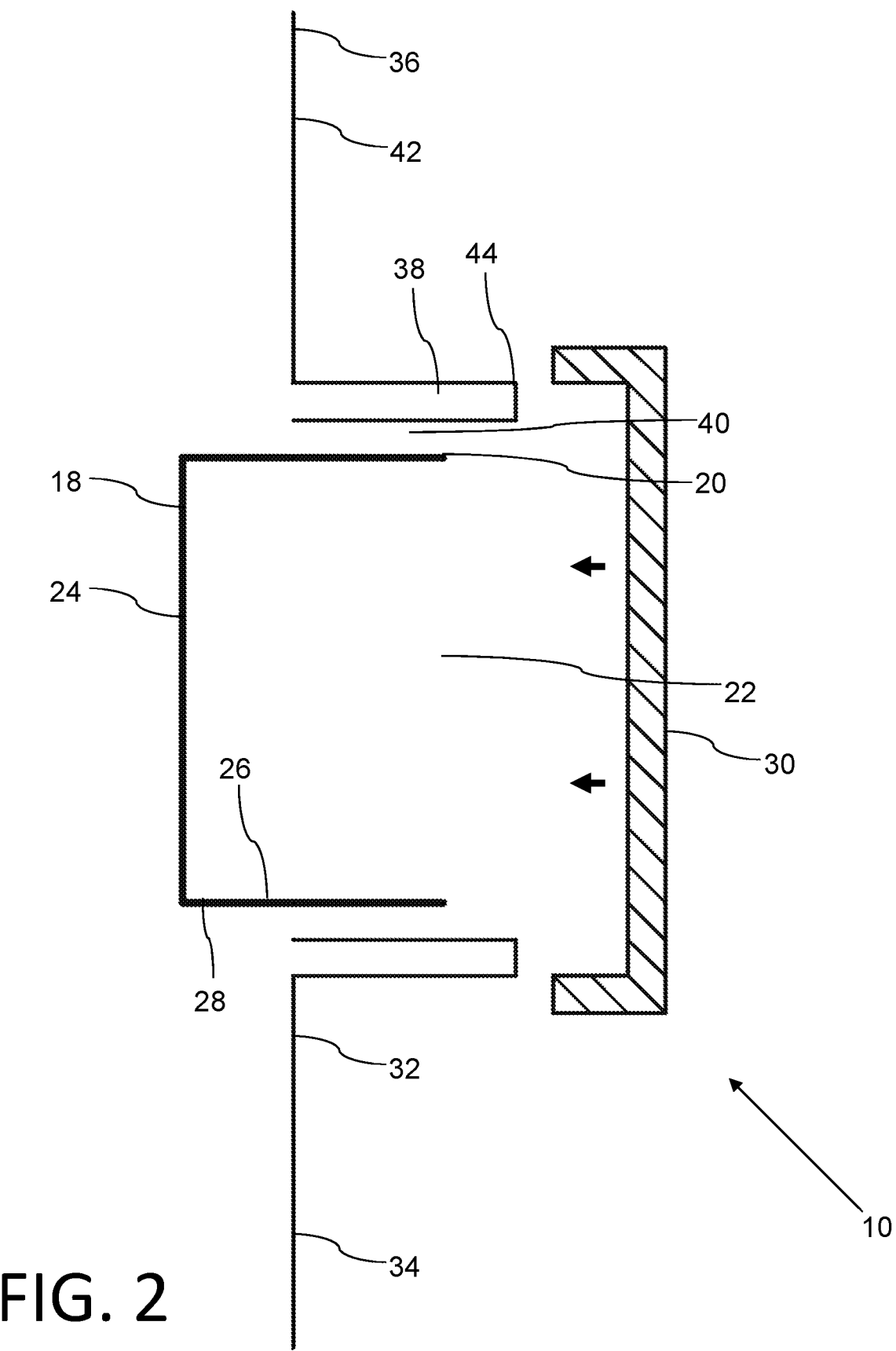
FIG. 2 is a side elevation view in cross section of a weatherproof enclosure with the cover plate removed.
Figure 3:
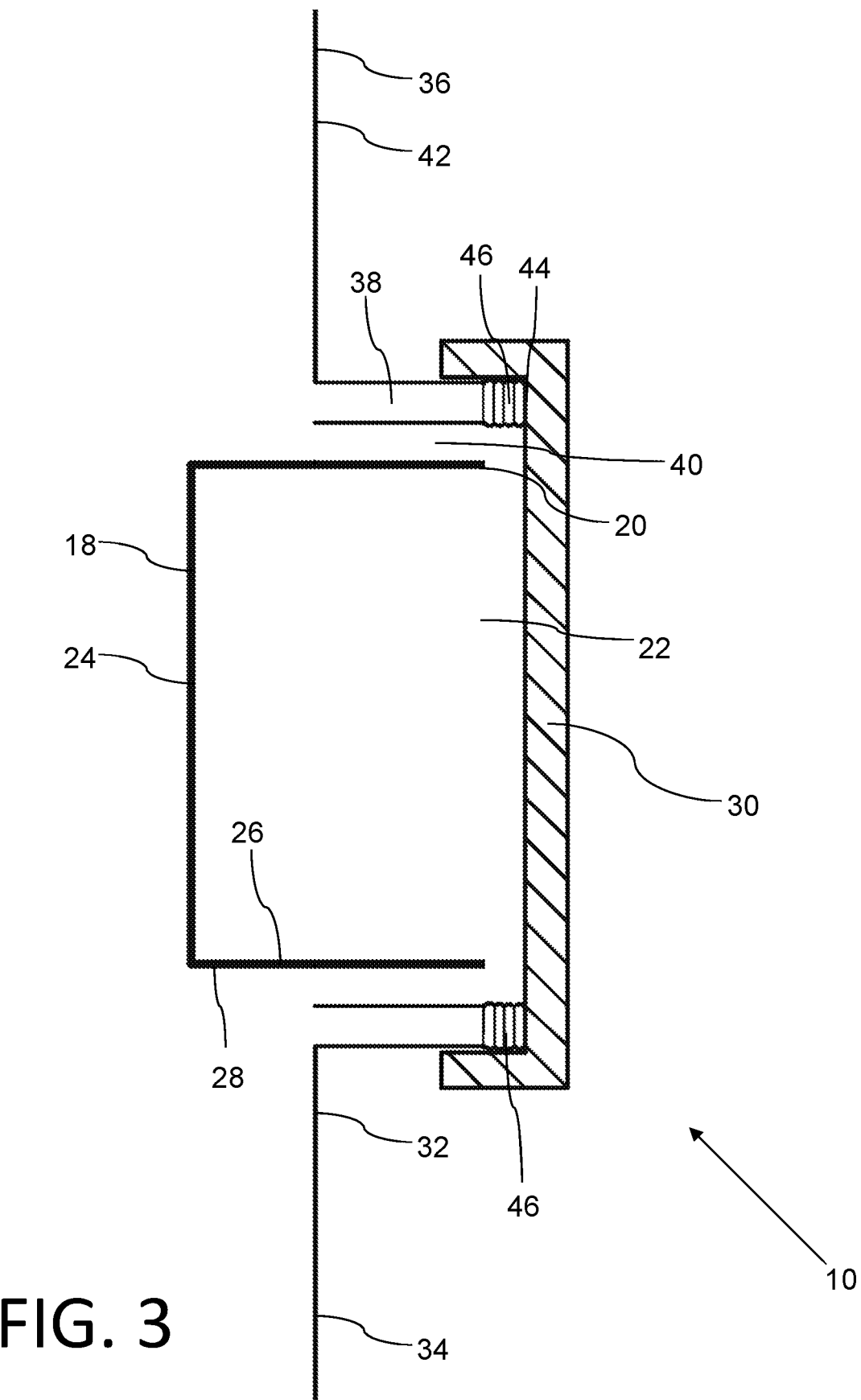
FIG. 3 is a side elevation view in cross section of a weatherproof enclosure with a collapsible structure.

Referring to FIG. 1-3, a weatherproof enclosure for a junction box 10 is provided on a wall 12. Wall 12 has an opening 14 through which cables or other tubulars 16 pass from the interior of a building to the exterior. Weatherproof enclosure 10 is provided for a junction box 18 that has a sidewall 20 that extends between an open end 22 and a closed end 24. Sidewall 20 has an inner surface 26 and an outer surface 28. A cover plate 30 is removably connected to junction box 18. Cover plate 30 is sized to cover open end 22 of junction box 18. Cover plate 30 is depicted herein as being generally rectangular, however, it will be understood that the relative size and dimensions of cover plate 30 may be varied depending on the application. Cover plate 30 is depicted both as having a flange or return area as shown, for example, in FIG. 6 and FIG. 24, and as being a flat cover plate, as shown, for example, in FIG. 29 and FIG. 30. It will be understood that cover plate 30 may also take other forms as required for the application, and may or may not form a weatherproof seal around its perimeter as described further herein.

Figure 7:
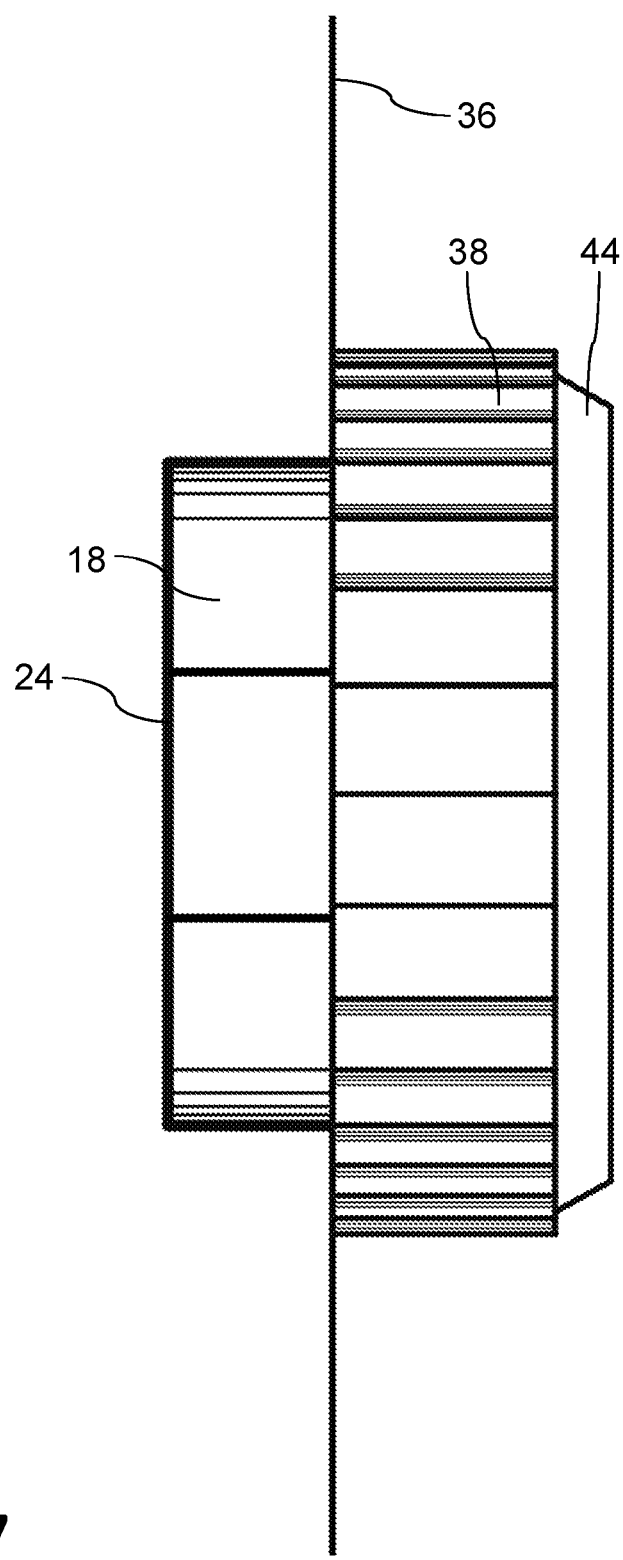
FIG. 7 is a side elevation view of a weatherproof enclosure with a corrugated flange.
Figure 8:
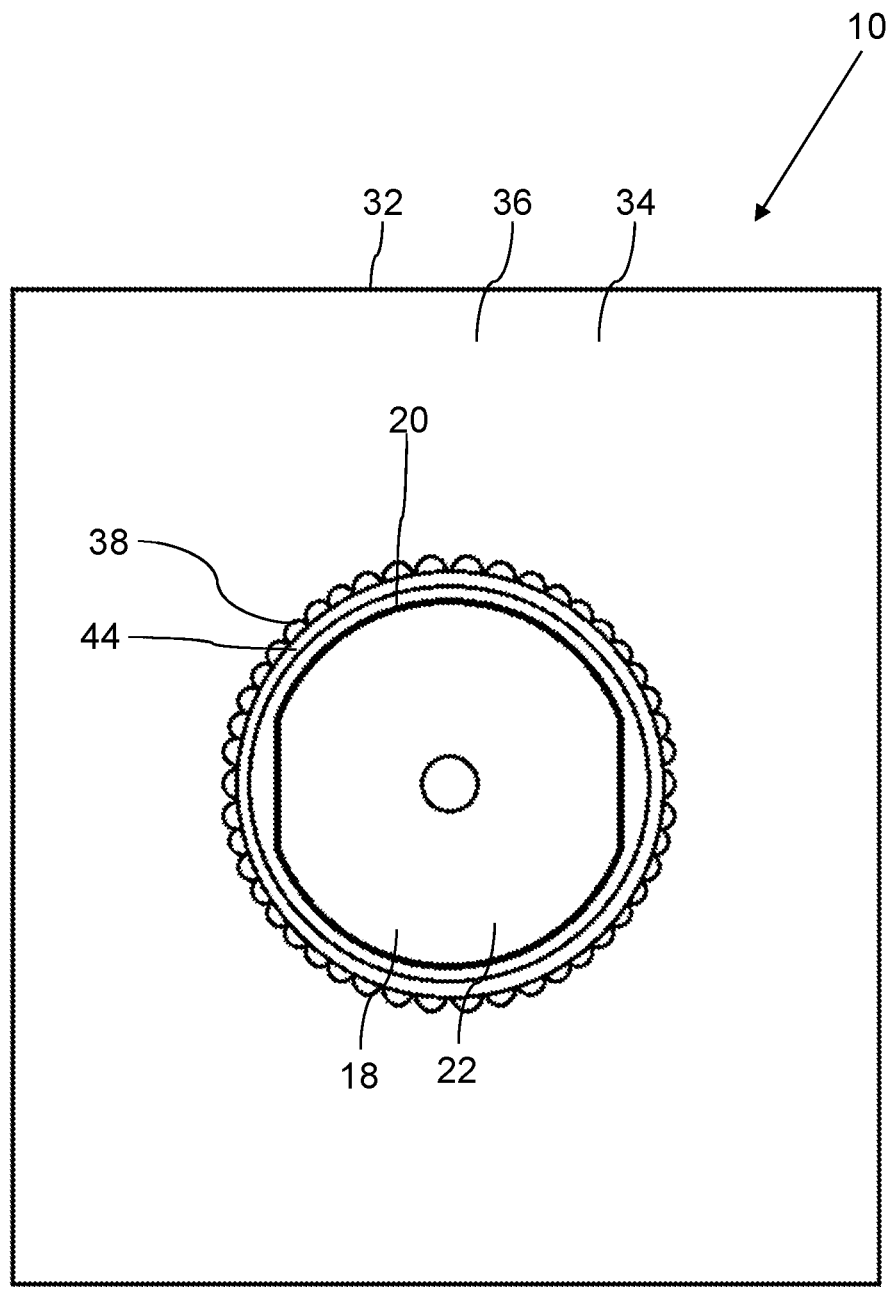
FIG. 8 is top plan view of a weatherproof enclosure with a corrugated flange.
Figure 10:
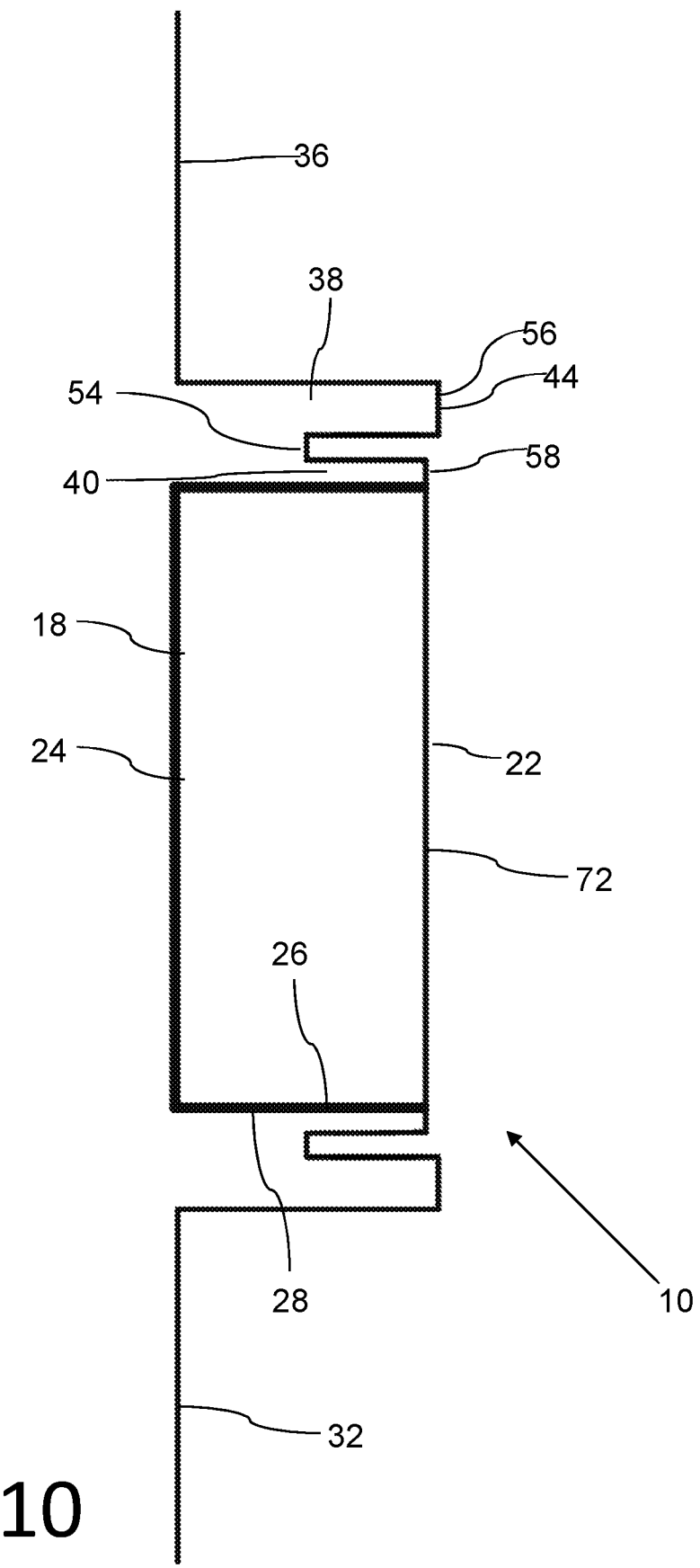
FIG. 10 is a side elevation view in cross section of a weatherproof enclosure with a telescoping flange after a junction box has been inserted.
Figure 11:
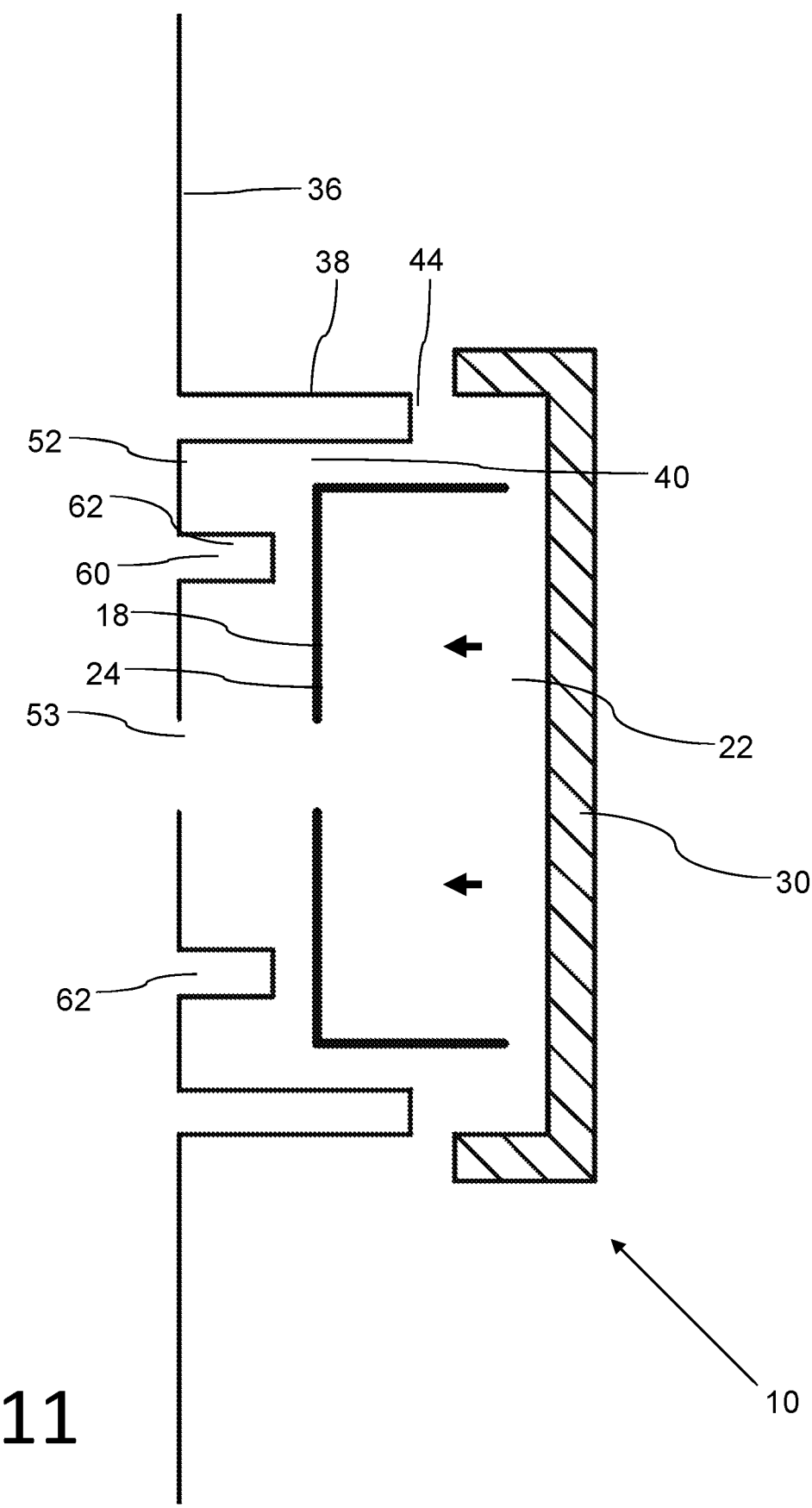
FIG. 11 is a side elevation view in cross section of a weatherproof enclosure with a collapsible protrusion formed in the rear wall before the cover plate has been attached.
Figure 12:
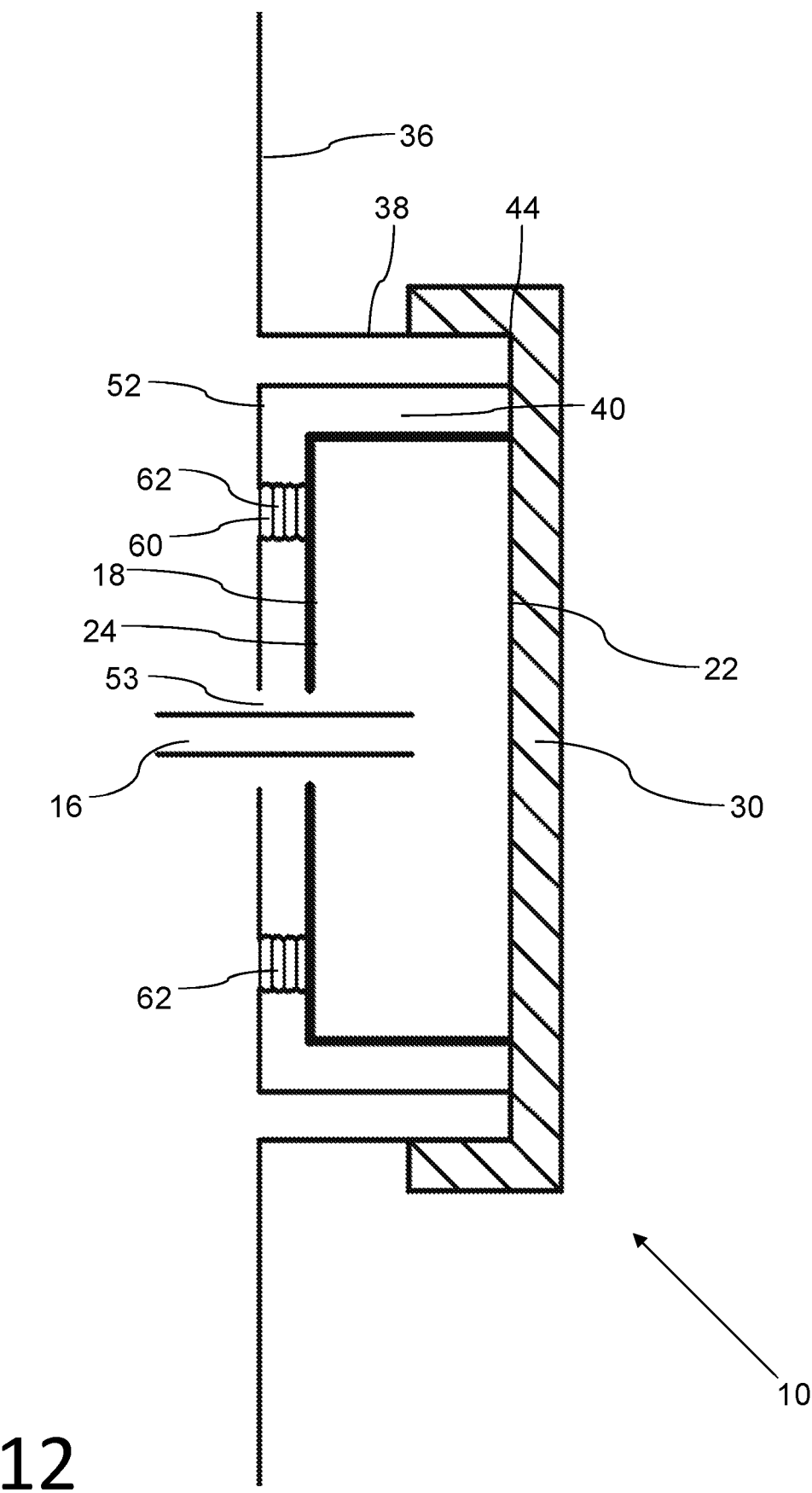
FIG. 12 is a side elevation view in cross section of a weatherproof enclosure with a collapsible protrusion formed in the rear wall after the cover plate has been attached.
Figure 13:
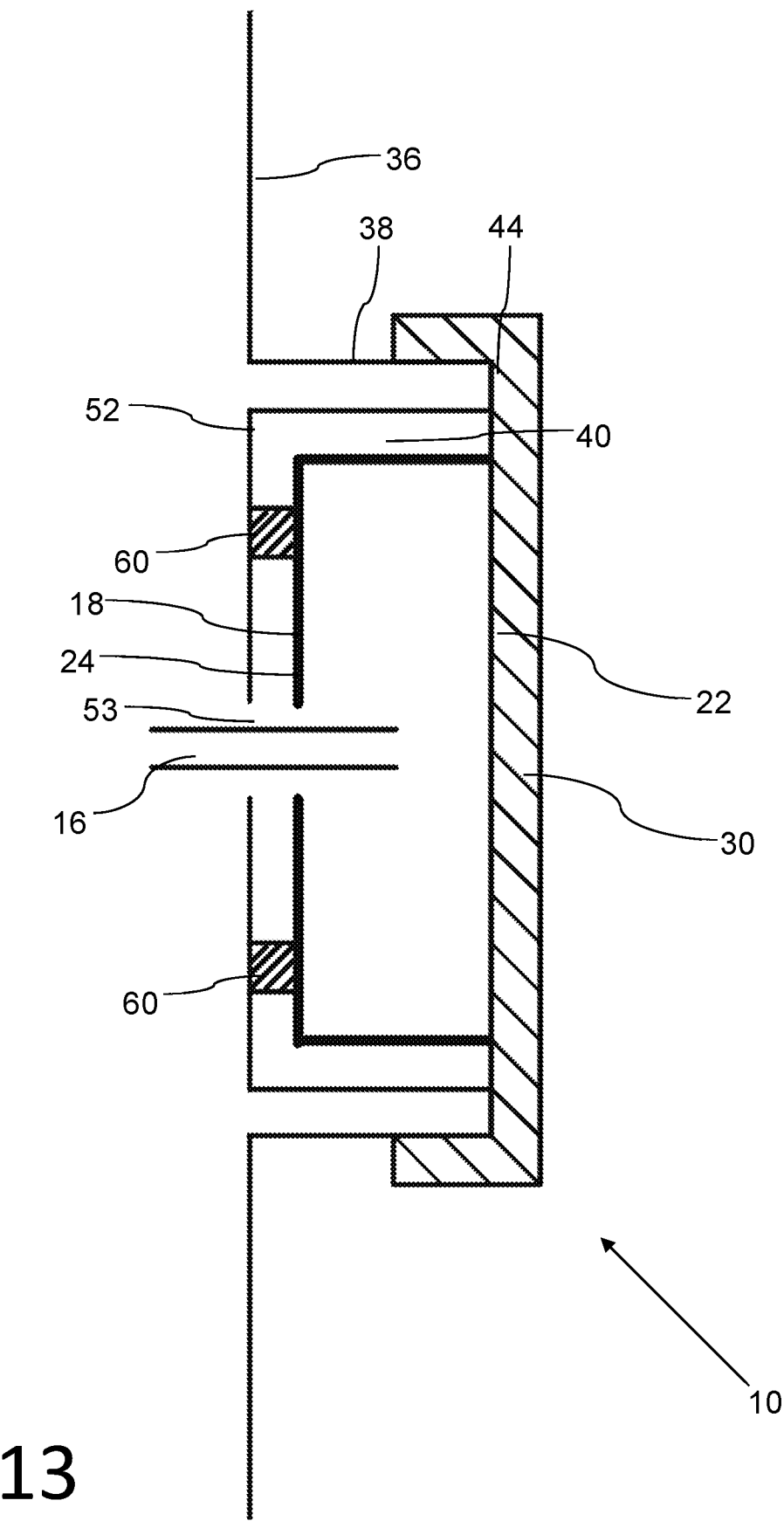
FIG. 13 is a side elevation view in cross section of a weatherproof enclosure with a sealing element placed between the rear wall and the junction box.
Figure 17:
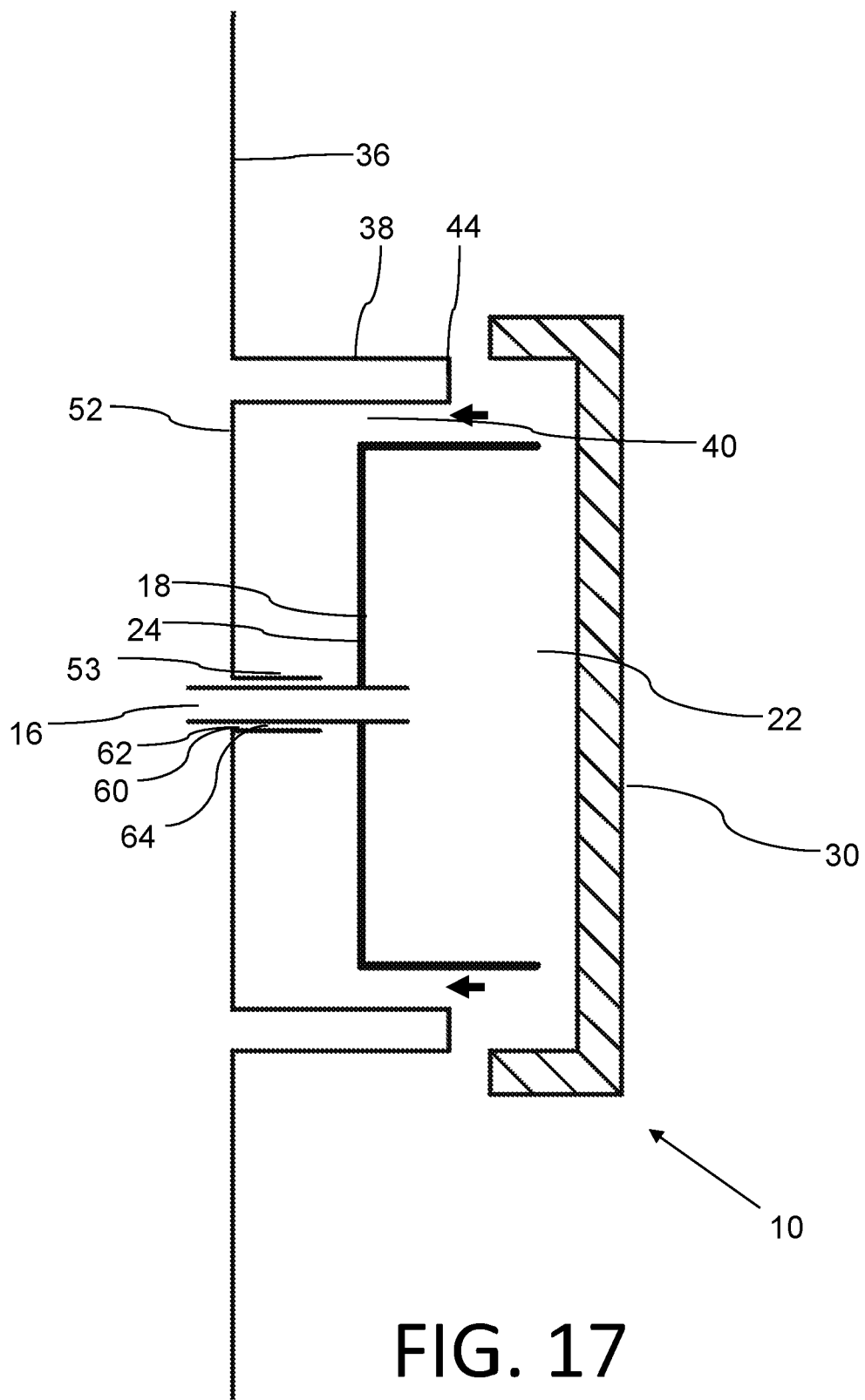
FIG. 17 is a side elevation view in cross section of a weatherproof enclosure with a collapsible protrusion formed in the rear wall and around the elongated member before the cover plate has been attached.

A weather barrier 32 is provided that has a sheet 34 made from non-permeable material, the sheet has a wall cover portion 36 that surrounds a flange 38 and flange 38 defines a junction box receiving area 40. Flange 38 protrudes from a first face 42 of wall cover portion 36 and terminates in a top peripheral edge 44. Weather barrier 32 may be constructed from a single sheet of material, such as by vacuum forming or other methods known in the art. Weather barrier 32 may be formed from a single material, where flange 38 is continuously and integrally formed with wall cover portion 36 from the same material. It will be understood that the same material is considered to be one where the material of flange 38 and wall cover portion 36 have the same material properties. Flange 38 may be constructed from a single layer of material, or may have a double-walled structure as shown in FIG. 9-14. Providing a double walled structure may allow flange 38 to be reinforced and increase the structural strength of flange 38. Flange 38 may also be provided with a corrugated structure as shown in FIGS. 7 and 8. It will be understood that the corrugated structure may be horizontal or vertical ribs or a series of protrusions and recessions. It will also be understood that the ribs may be provided on any of the embodiments described herein, such as on the rectangular embodiment shown in FIG. 5. The corrugated structure may also serve to provide structural strength to flange 38, or may be provided to control the collapse of a collapsible structure upon installation of cover plate 30. Junction box receiving area 40 may be open towards the building, as shown in FIGS. 2 and 3, or may have a rear wall 52 opposite top peripheral edge 44, as shown in FIGS. 11 and 12. Rear wall 52 may have an opening 53 that allows cables or other tubulars to pass between the building and junction box 18, or rear wall 52 may be provided with frangible portions or a cuttable surface that can be opened during installation to allow for passage of the cables to junction box 18. An embodiment where this cuttable portion may be provided is shown in FIG. 17.

Figure 4:
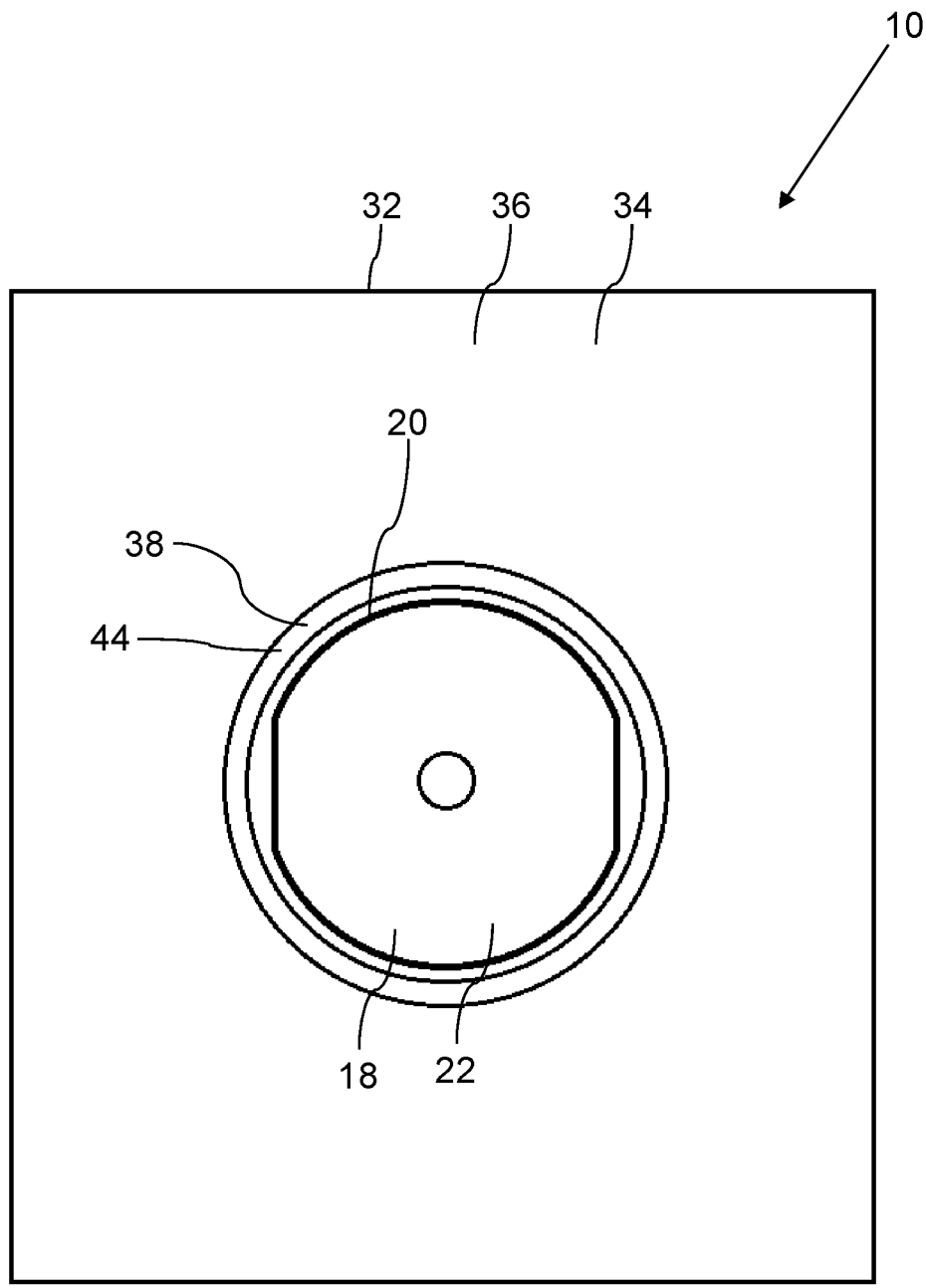
FIG. 4 is a top plan view of a circular weatherproof enclosure.
Figure 5:
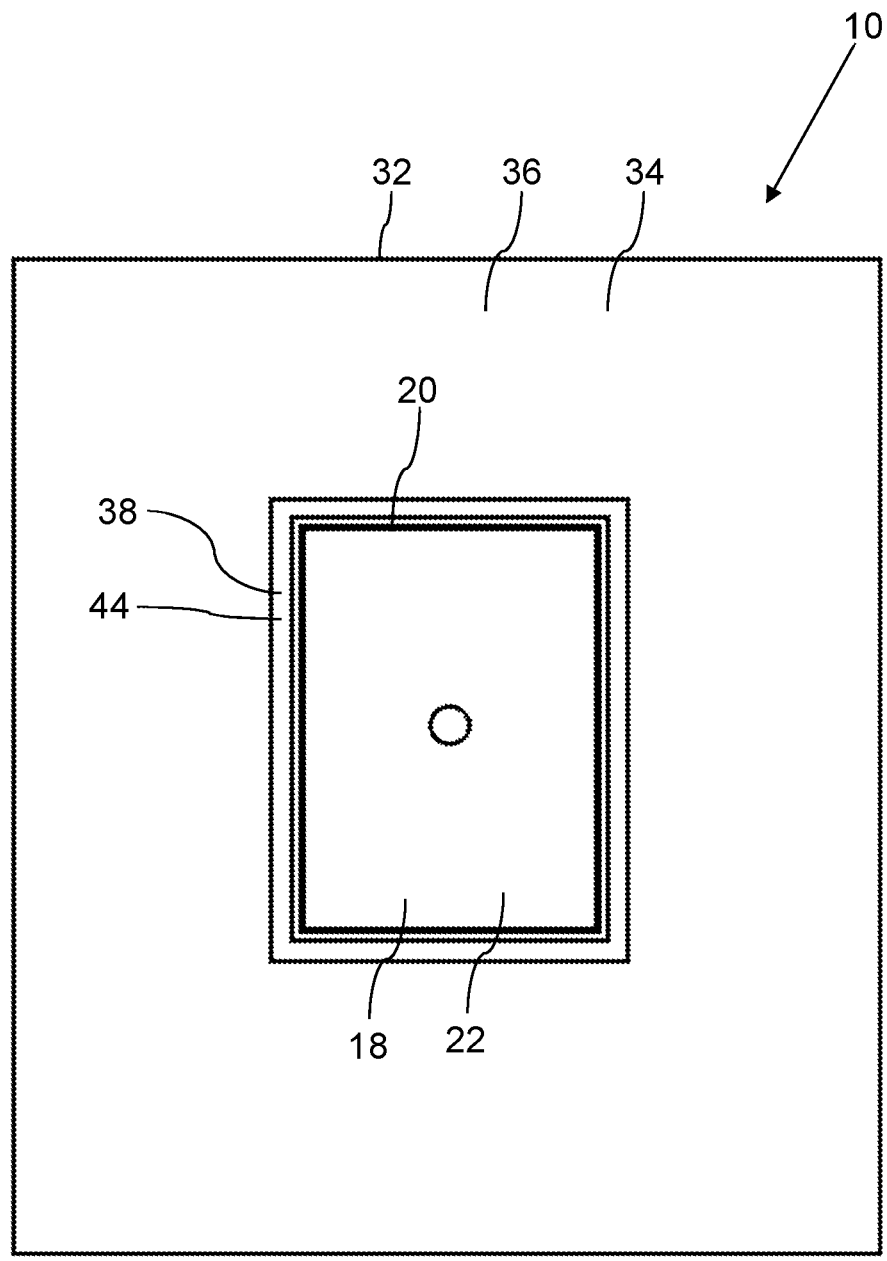
FIG. 5 is a top plan view of a rectangular weatherproof enclosure.
Figure 23:
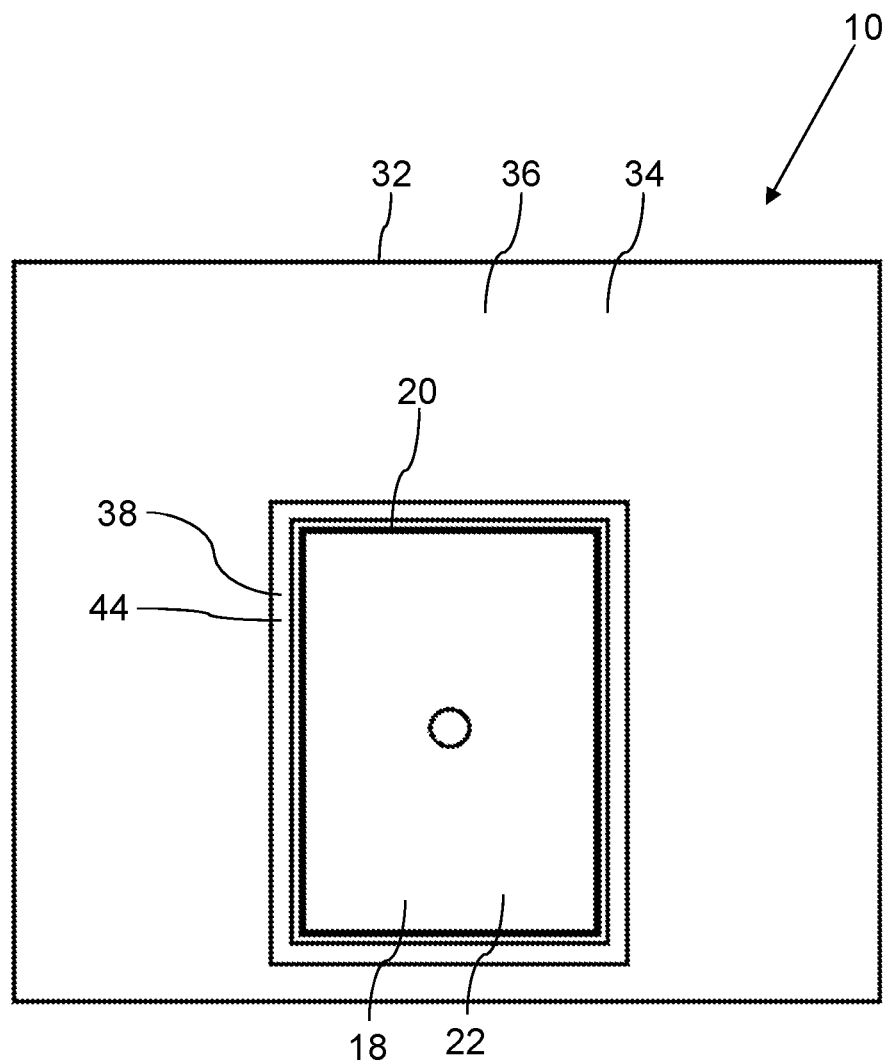
FIG. 23 is a top plan view of a rectangular weatherproof enclosure with a smaller lower wall cover portion.
Figure 24:
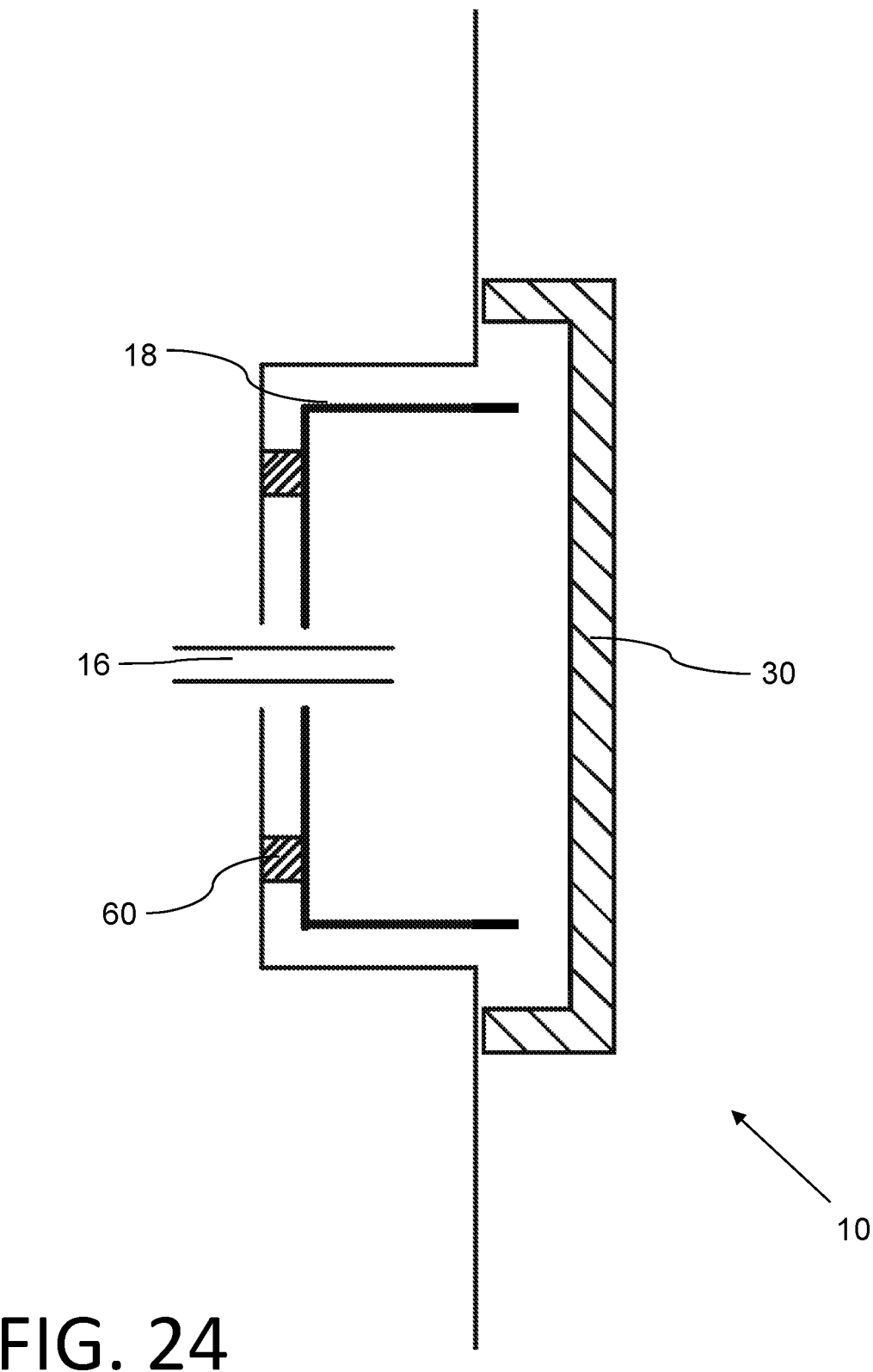
FIG. 24 is a side elevation view in cross section of a weatherproof enclosure with a seal formed around the back portion of a junction box.

Junction box 18 is positioned within junction box receiving area 40 such that flange 38 surrounds junction box 18 and top peripheral edge 44 extends toward open end 22 of junction box 18. As shown in FIGS. 4 and 5, in a plane parallel to wall cover portion 36 of sheet 34, junction box receiving area 40 may have a cross-sectional area that is greater than a cross sectional area of junction box 18. This may allow junction box 18 to be loosely received within junction box receiving area 40, and may also allow a given size of junction box receiving area 40 to receive multiple different sizes of junction boxes 18. FIGS. 4 and 5 depict examples of junction box receiving area 40 that are sized to receive a circular and rectangular junction box 18 respectively. FIGS. 4 and 5 show junction box 18 and weather barrier 32 without cover plate 30. It will also be understood that wall cover portion 36 need not be symmetrical around junction box receiving area 40, and the dimensions of wall cover portion 36 may be varied as required for the application. For example, the dimensions of the bottom portion of wall cover portion 36 may be reduced as shown in FIG. 23.

Figure 6:
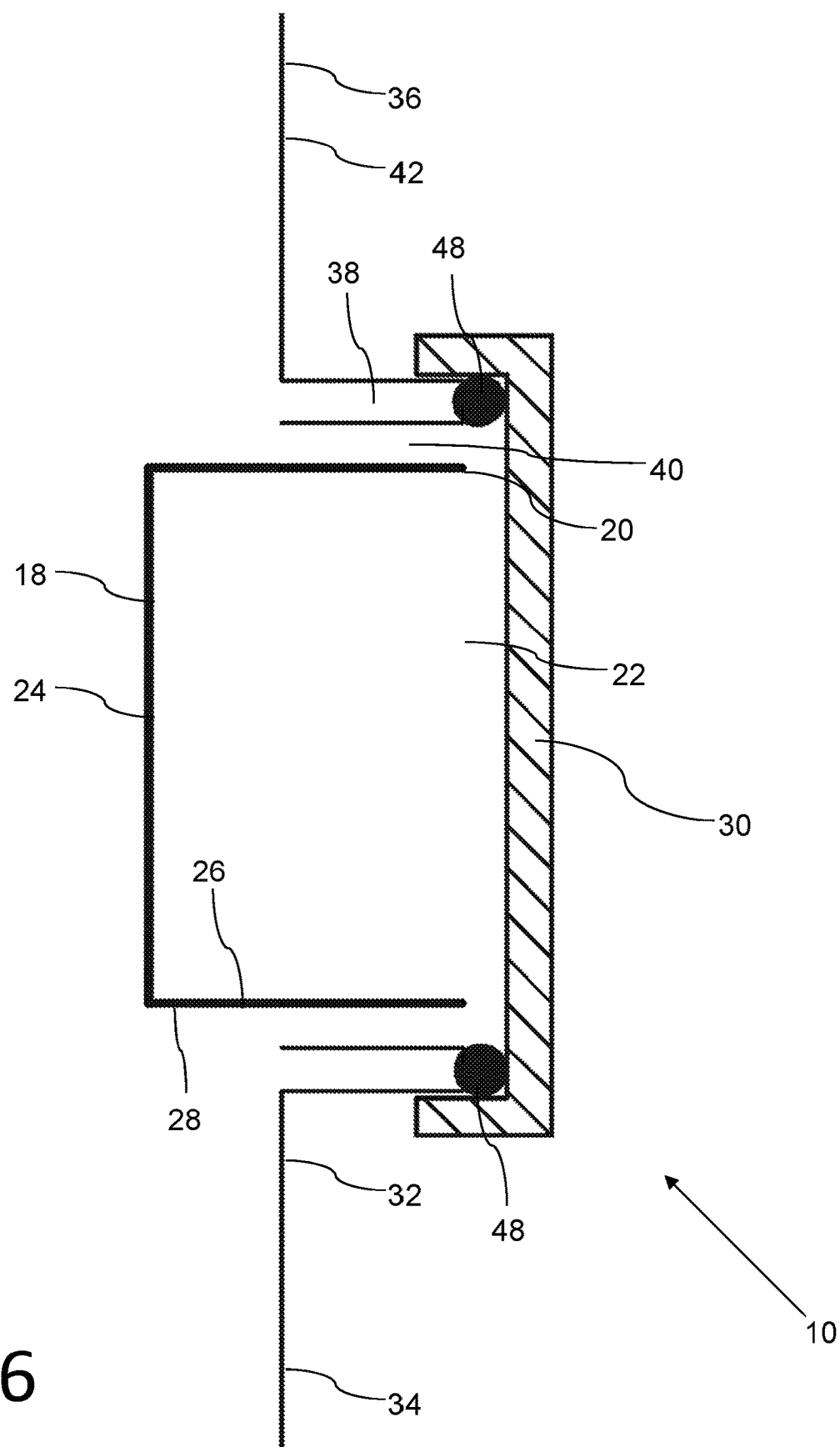
FIG. 6 is a side elevation view in cross section of a weatherproof enclosure with a sealing element.
Figure 15:
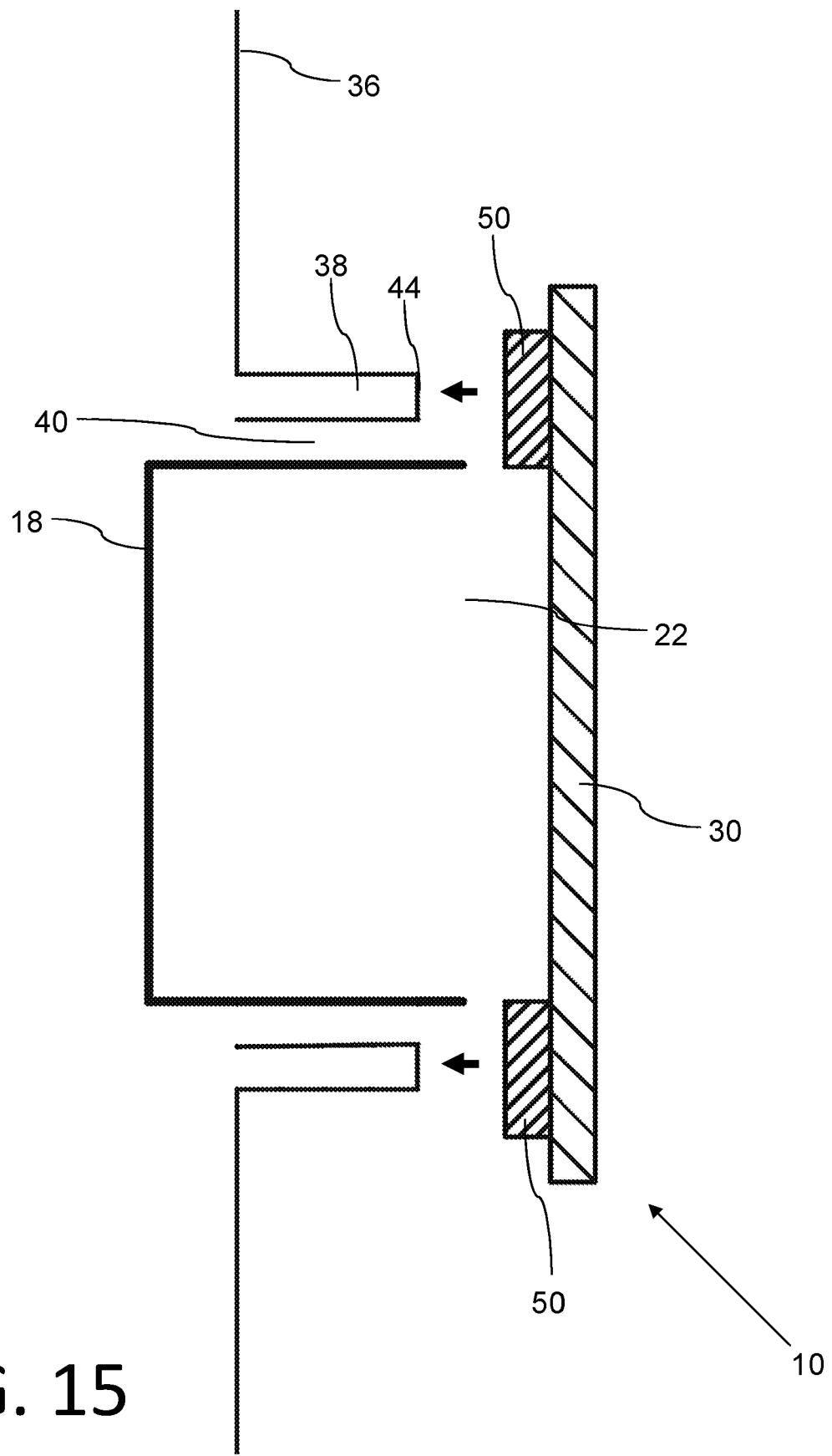
FIG. 15 is a side elevation view in cross section of a weatherproof enclosure with a sealing element attached to the cover plate before the cover plate has been attached.
Figure 16:
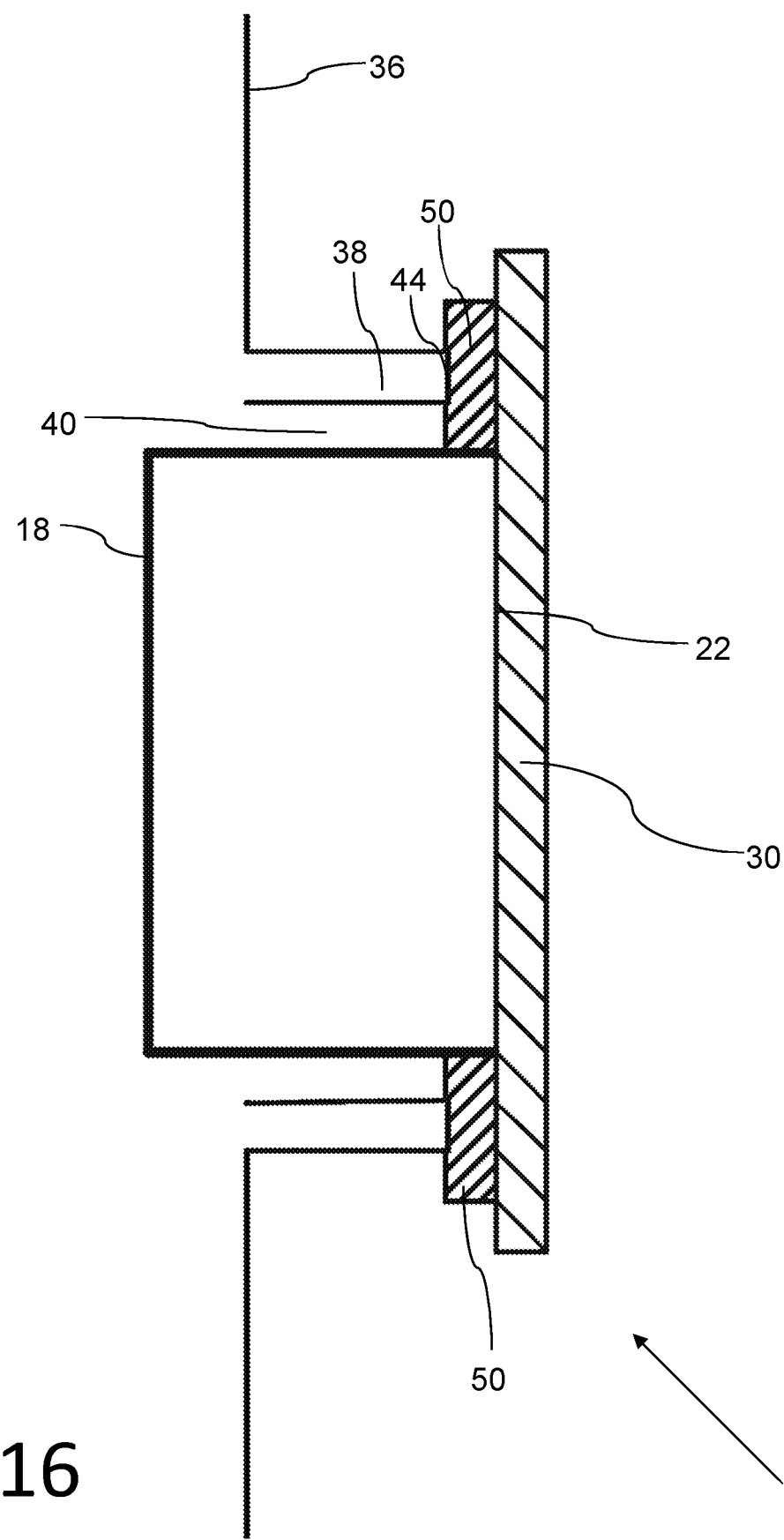
FIG. 16 is a side elevation view in cross section view of a weatherproof enclosure with a sealing element attached to the cover plate after the cover plate has been attached.
Figure 30:
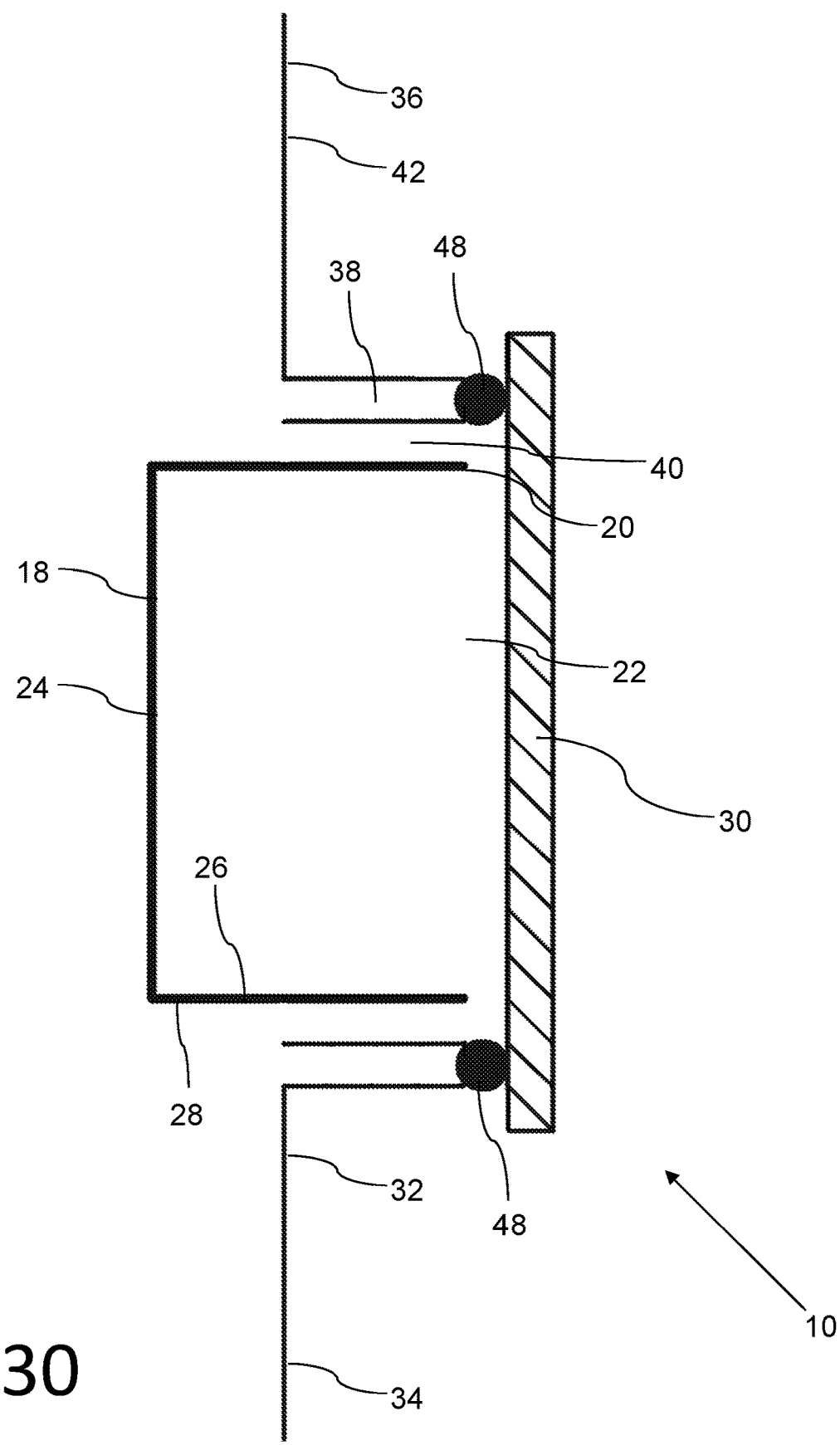
FIG. 30 is a side elevation view in cross section of a weatherproof enclosure with a sealing element and an alternative cover plate.

Referring to FIG. 3, cover plate 30 engages and forms a seal with top peripheral edge 44 of flange 38 when cover plate 30 is connected to junction box 18. As shown in FIG. 2, flange 38 may be sized such that it extends past open end 22 of junction box 18 to engage with cover plate 30. Flange 38 may be made from a deformable material that deforms against cover plate 30 as shown in FIG. 3 when cover plate 30 is installed on junction box 18. For example, flange 38 may be provided with a collapsible structure 46 at top peripheral edge 44 that collapses under pressure from cover plate 30 to form a seal. Flange 38 may also carry a resilient sealing member 48 at top peripheral edge 44 that seals against cover plate 30, as shown in FIG. 6 and FIG. 30. It will be understood that other types of sealing elements as are known in the art may be used at top peripheral edge 44, such as adhesive sealing tape. Cover plate 30 may also carry a sealing material 50 that seals against top peripheral edge 44 of flange 38 when cover plate 30 is installed on junction box 18, as shown in FIGS. 15 and 16. For example, sealing material 50 may be a foam border within cover plate 30 that engages and compresses against top peripheral edge 44. In this case, flange 38 may be sized to be flush with open end 22 of junction box 18, or it may be recessed away from open edge 22 of junction box 18, with sealing material 50 carried by cover plate 30 making up the distance to form a seal, as shown in FIG. 16. It will be understood that other methods of sealing between the surface of cover plate 30 and top peripheral edge 44 of flange 38 may be used, as understood by those skilled in the art. It will also be understood that the seal may rely on friction or the contact between surfaces, and that the seal need only be sufficient to weatherproof the structure and prevent moisture from travelling into junction box receiving area 40.

Figure 9:
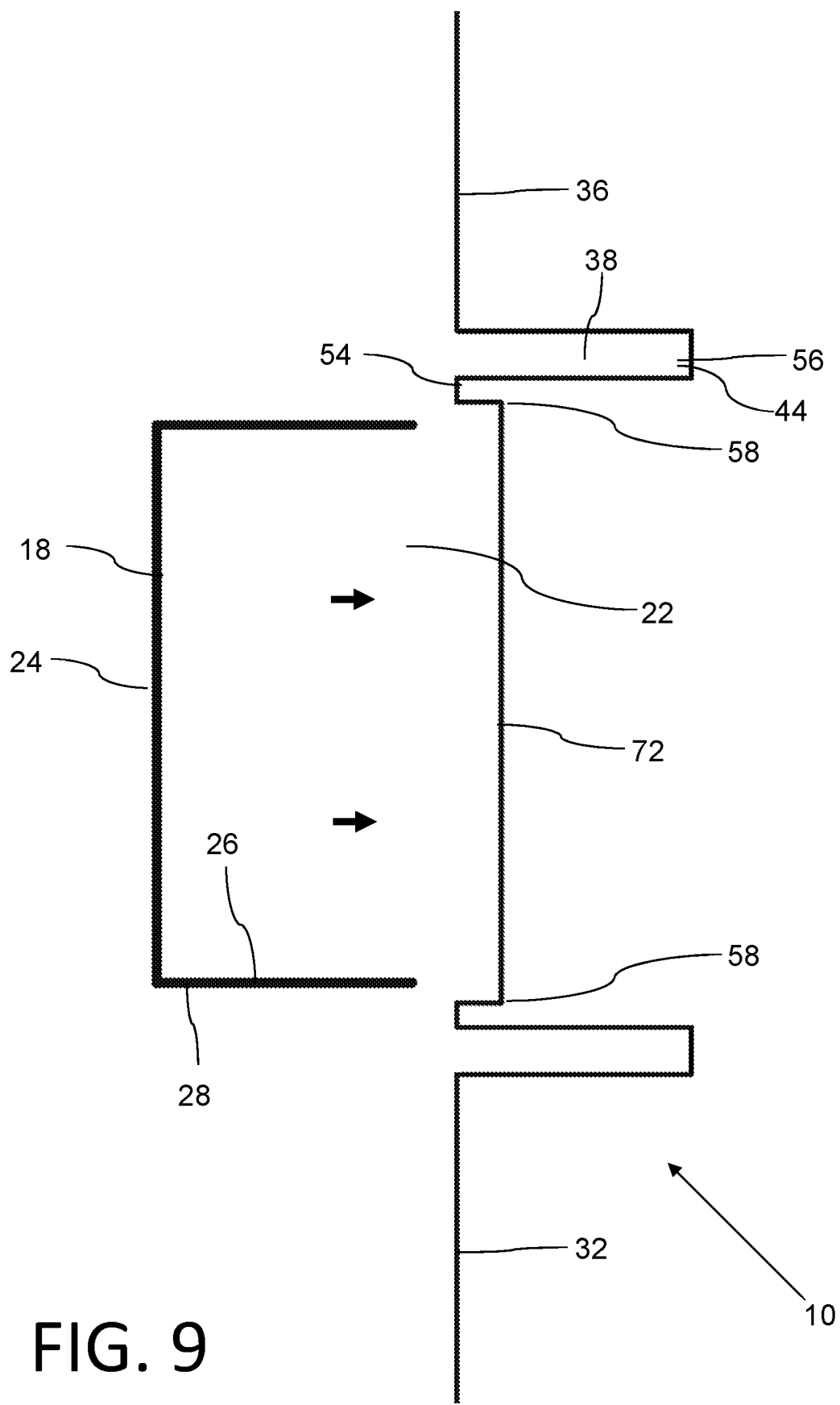
FIG. 9 is a side elevation view in cross section of a weatherproof enclosure with a telescoping flange before a junction box has been inserted.
Figure 27:
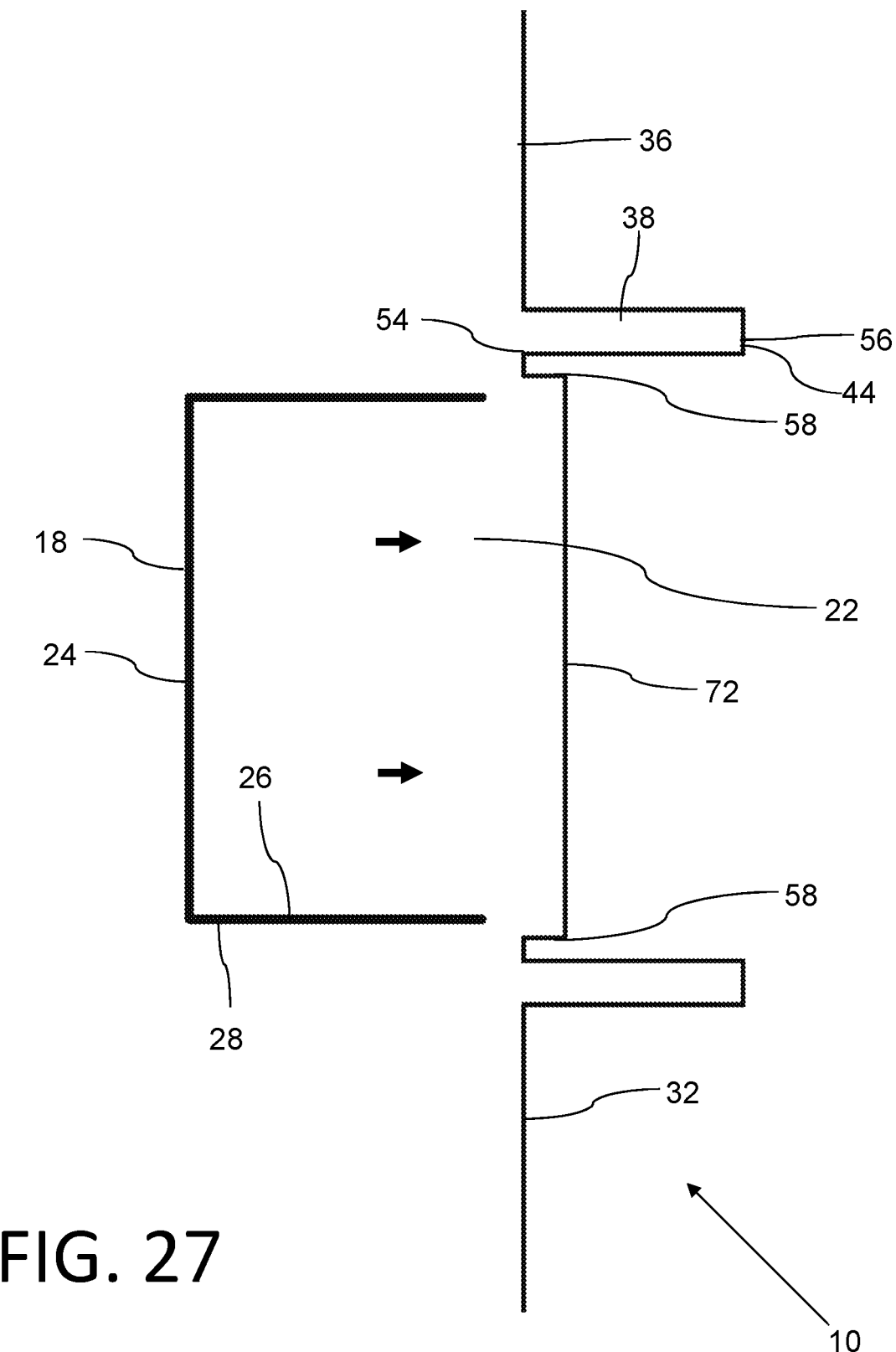
FIG. 27 is a side elevation view in cross section of a weatherproof enclosure with a telescoping flange before an alternative junction box has been inserted.
Figure 28:
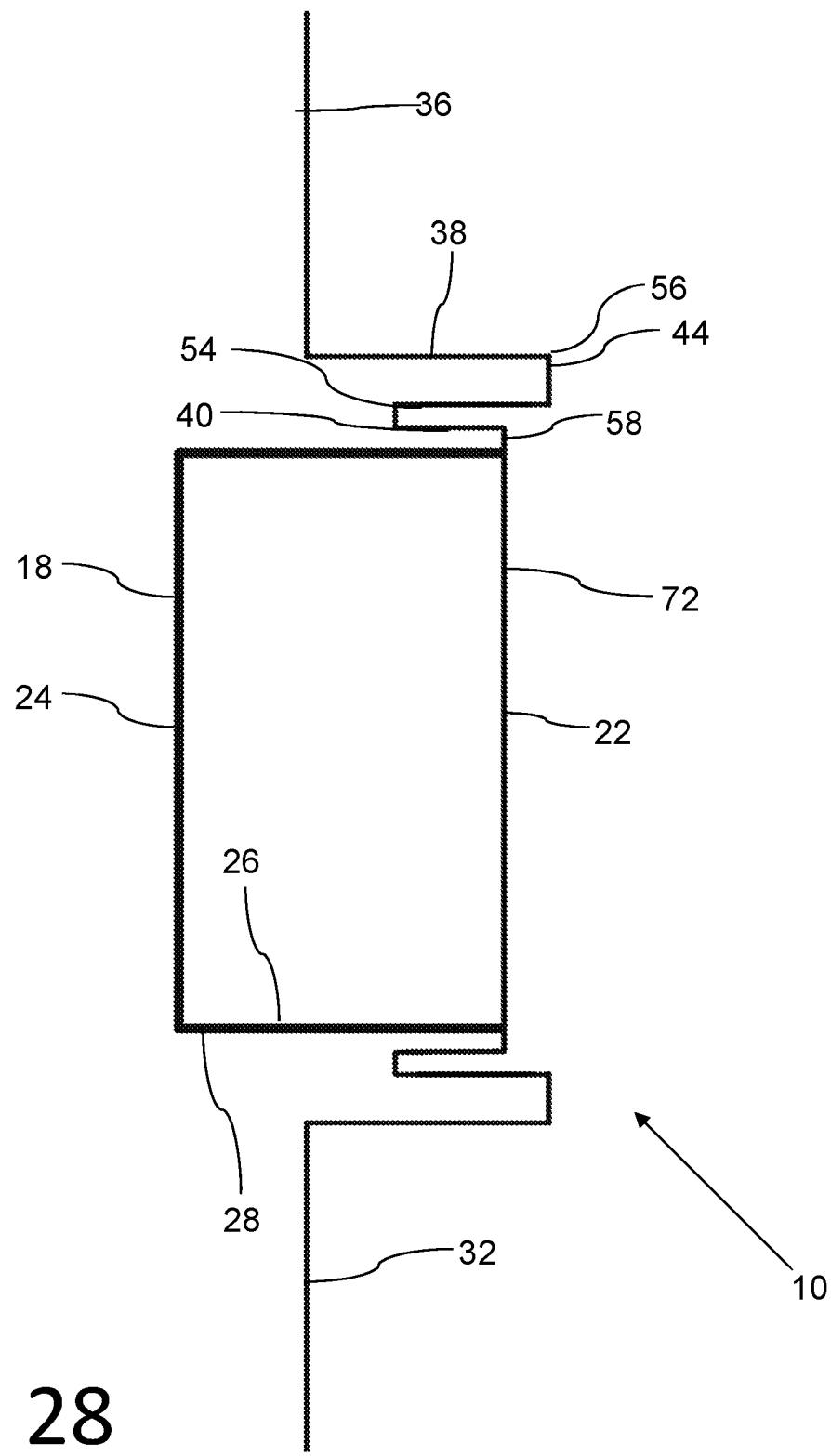
FIG. 28 is a side elevation view in cross section of a weatherproof enclosure with a telescoping flange after an alternative junction box has been inserted.
Figure 29:
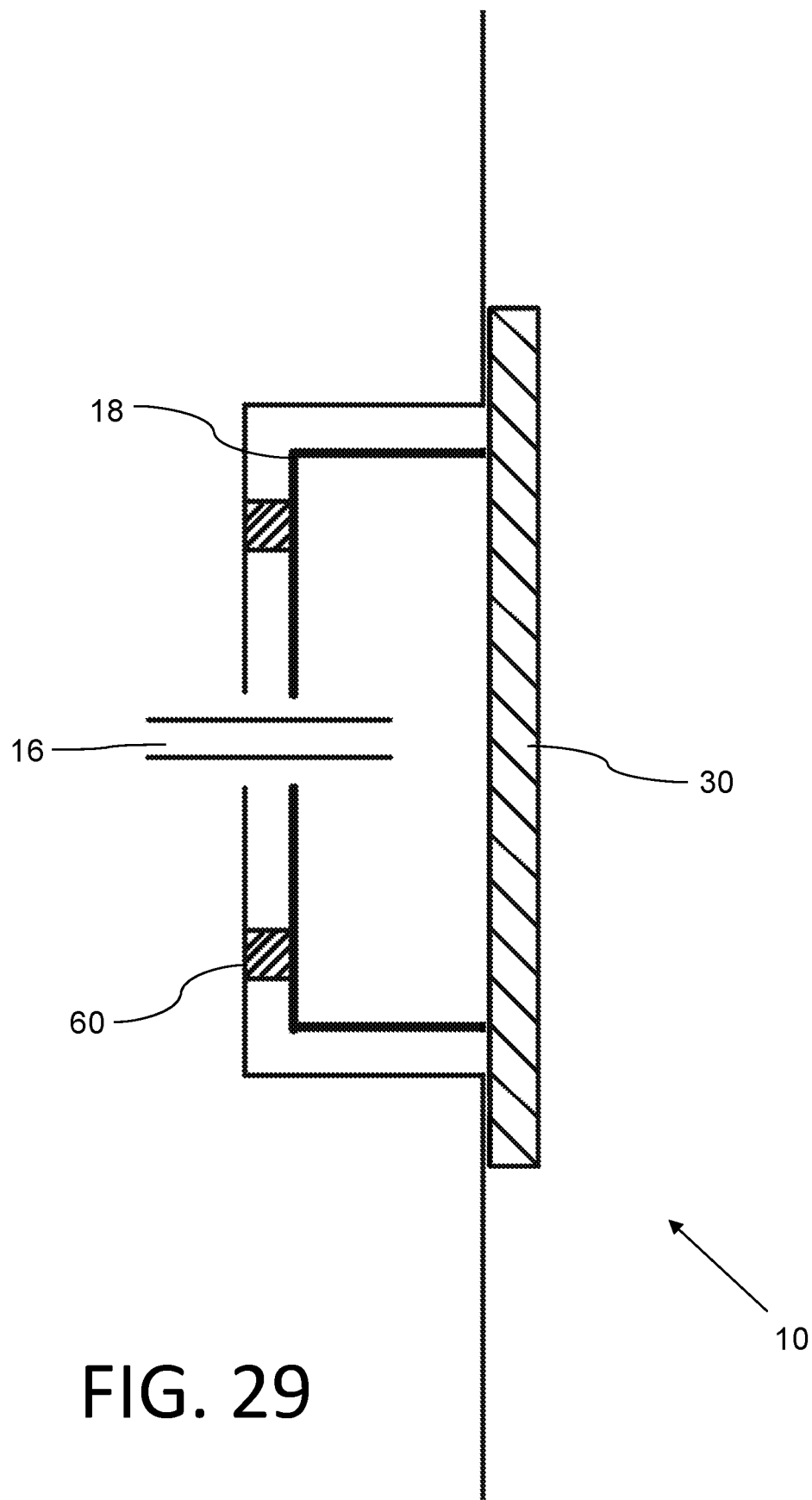
FIG. 29 is a side elevation view in cross section of a weatherproof enclosure with a seal formed around the back portion of a junction box and an alternative cover plate.

Referring to FIG. 9, flange 38 may also be provided with a double-walled structure that has a first end 54 connected to wall cover portion 36 and a second end 56 connected to a telescoping wall 58 that is positioned within junction box receiving area 40. In this case, top peripheral edge 44 is defined by a fold in flange 38, such that, when junction box 18 is inserted into junction box receiving area 40 from a rear surface 72 of wall cover portion 36 toward top peripheral edge 44 of flange 38, telescoping wall 58 engages and moves with open end 22 of junction box 18, as shown in FIG. 10. A telescoping wall 58 is also shown in FIG. 27 and FIG. 28. It will be understood that telescoping wall 58 may be provided as a dust cover or protective surface for junction box 18 during installation of wall cover materials such as stucco. Telescoping wall 58 may be cut away in whole or in part after installation and prior to attaching cover plate 30 to allow for access from the exterior of the building to the interior of junction box 18. A seal may be formed against a portion of this dust cover by applying cover plate 30, or a seal may be formed using any of the methods described herein that are compatible with the structure. It will be understood that all of the embodiments described herein may be used with junction boxes 18 having different dimensions. For example, in the embodiment shown in FIG. 9 and FIG. 10, junction box 18 is sized such that the rear of junction box 18 can sit within the same plane as wall cover portion 36 after installation. In the embodiment shown in FIG. 27 and FIG. 28, junction box 18 is sized such that it extends away from wall cover portion 36, and may extend into wall 12. It will also be understood that junction box 18 may extend different distances within the dust cover relative to flange 38, depending on the requirements of the application.

Referring to FIG. 9, FIG. 10, FIG. 27, and FIG. 28, a method of forming a weatherproof enclosure 10 on the exterior of a wall 12 will now be described. A hole is formed in wall 12, and weather barrier 32 is installed on the exterior of wall 12 adjacent to the hole. Junction box 18 is positioned within the junction box receiving area 40 and is inserted into junction box receiving area 40 such that telescoping wall 58 engages and moves with the open end 22 of junction box 18 and a rear surface 72 of wall cover portion 36 moves towards top peripheral edge 44 of flange 38. Junction box 18 is then secured to the wall. As discussed above, a cover plate may then be attached that forms a seal against top peripheral edge 44 of flange 38, or a seal may be formed in another manner. Telescoping wall 58 may be cut to provide access to junction box 18 from the exterior of the wall 12.

Figure 14:
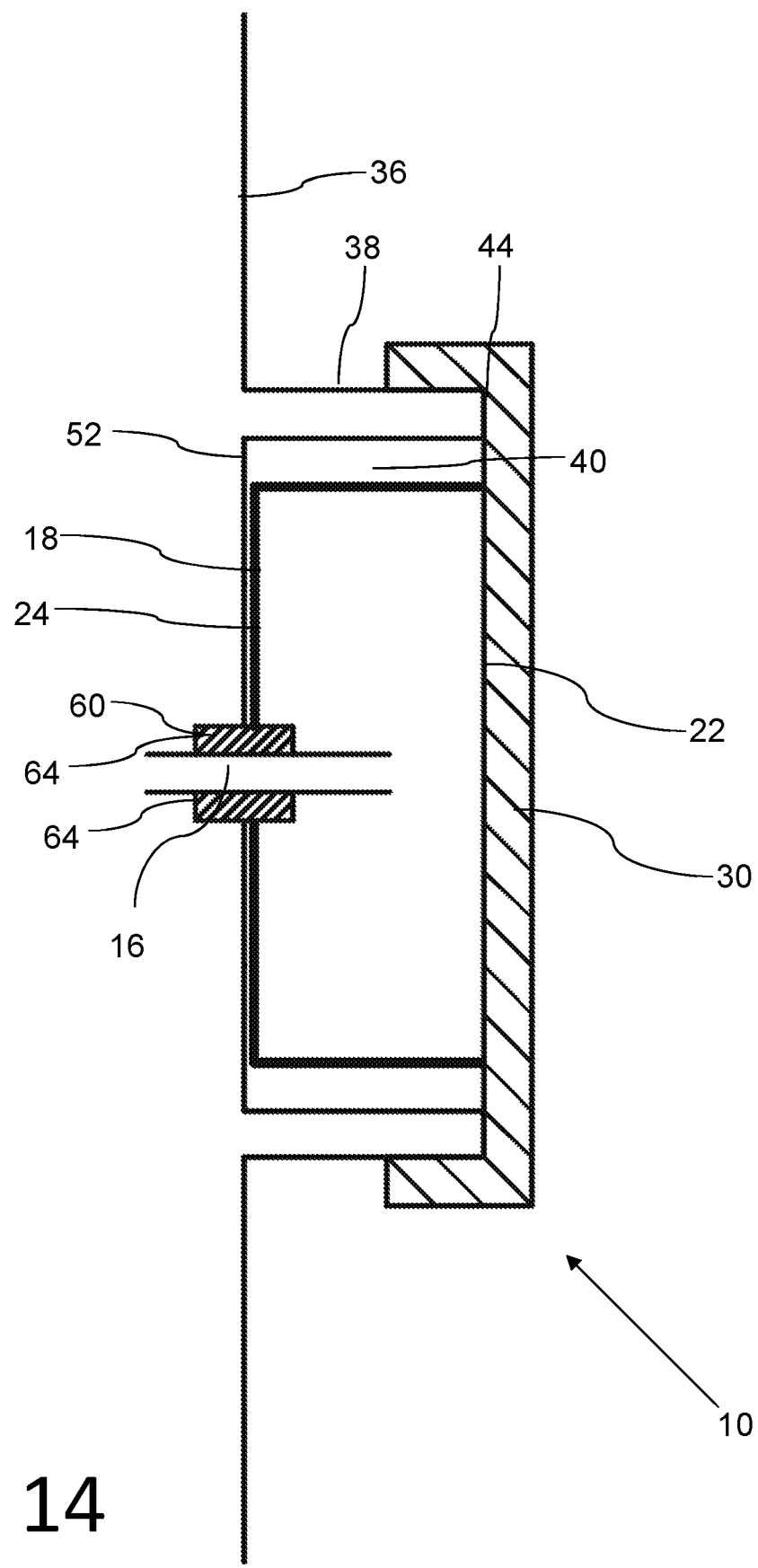
FIG. 14 is a side elevation view in cross section of a weatherproof enclosure with a sealing element adjacent to the elongated member placed in the opening in the rear wall.
Figure 18:
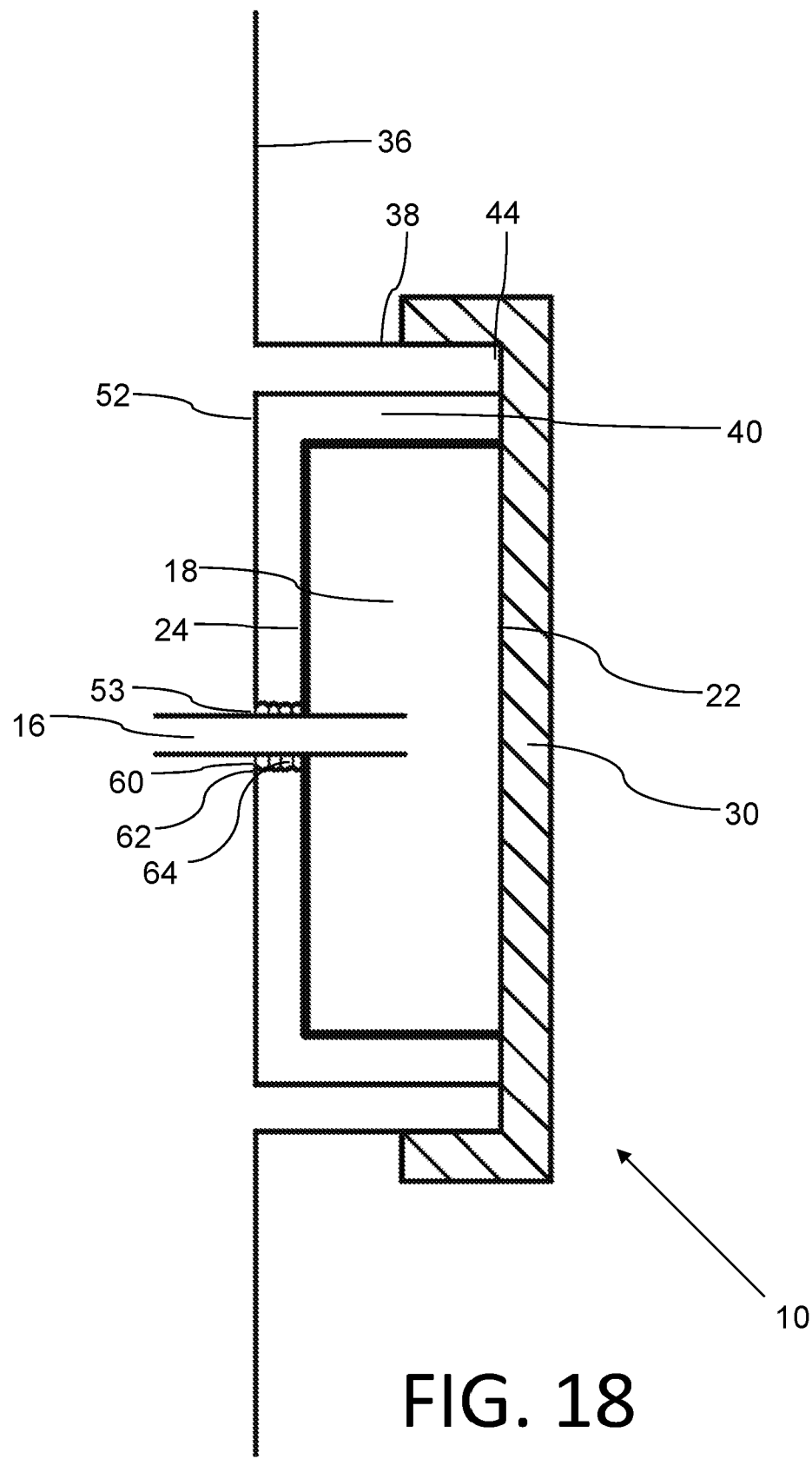
FIG. 18 is a side elevation view in cross section of a weatherproof enclosure with a collapsible protrusion formed in the rear wall and around the elongated member after the cover plate has been attached
Figure 19:
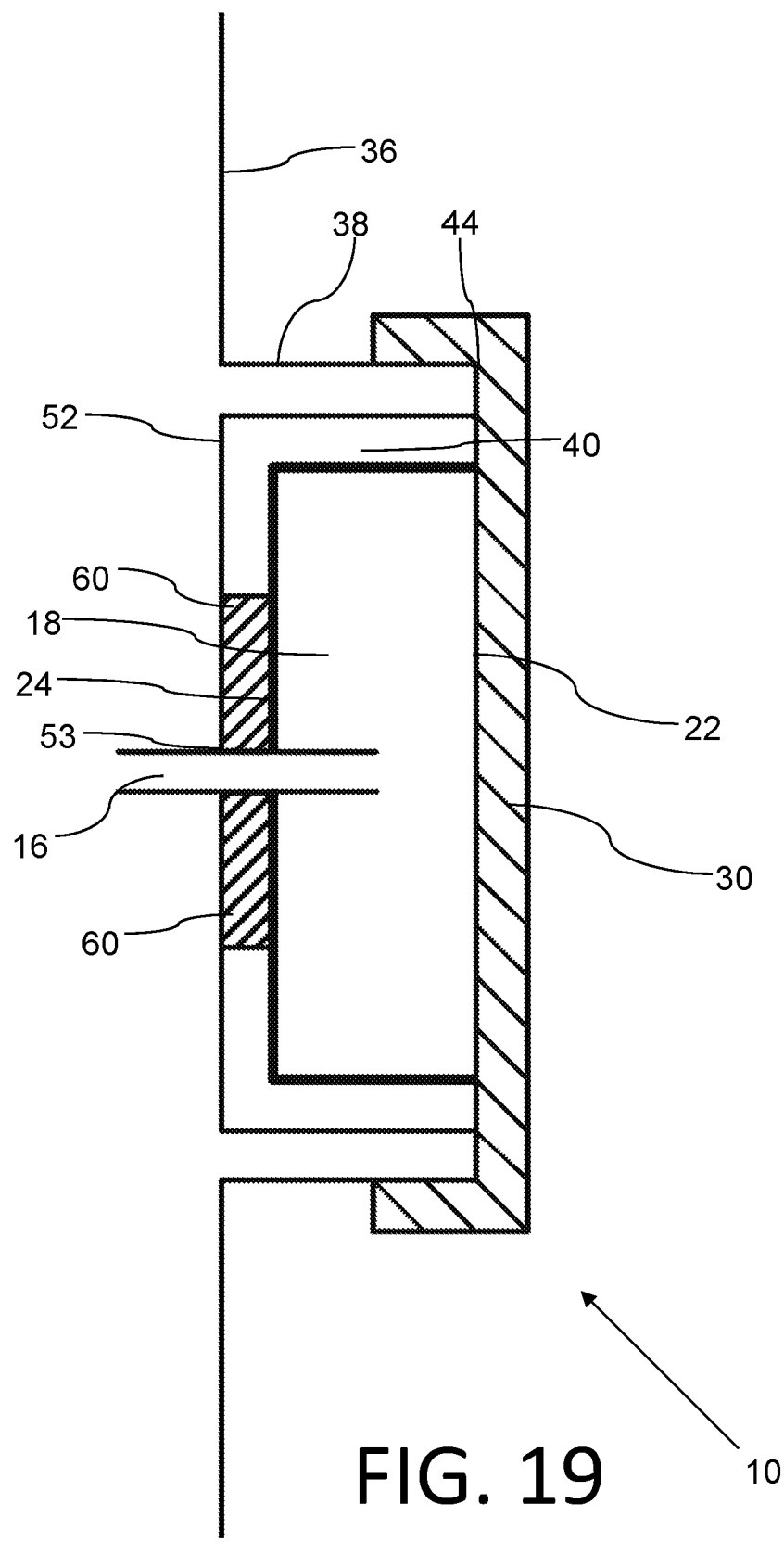
FIG. 19 is a side elevation view in cross section of a weatherproof enclosure with a sealing element placed between the rear wall and the junction box that engages the elongated member.
Figure 20:
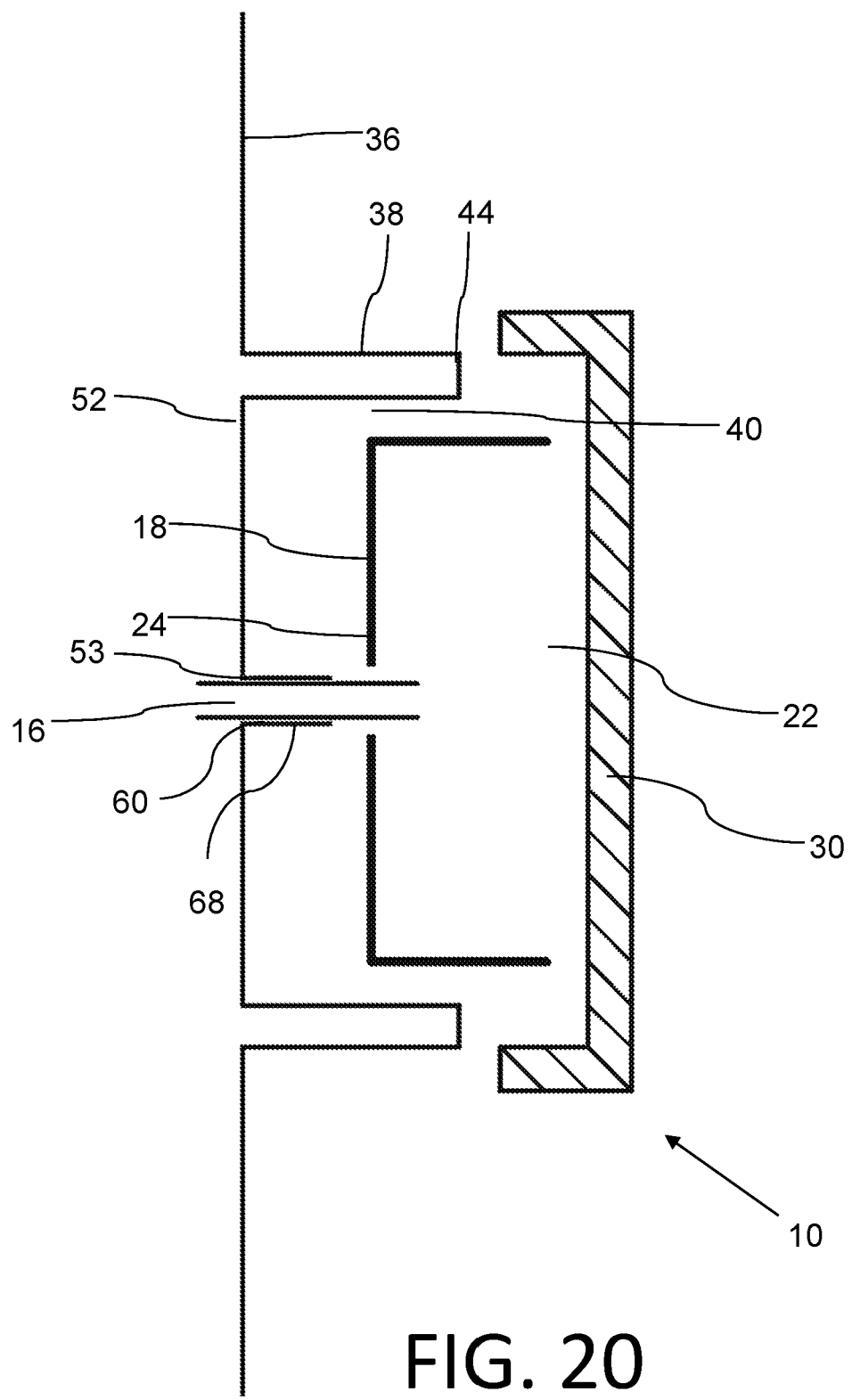
FIG. 20 is a side elevation view in cross section of a weatherproof enclosure with an interior protrusion formed in the rear wall and around the elongated member before the cover plate has been attached.
Figure 21:
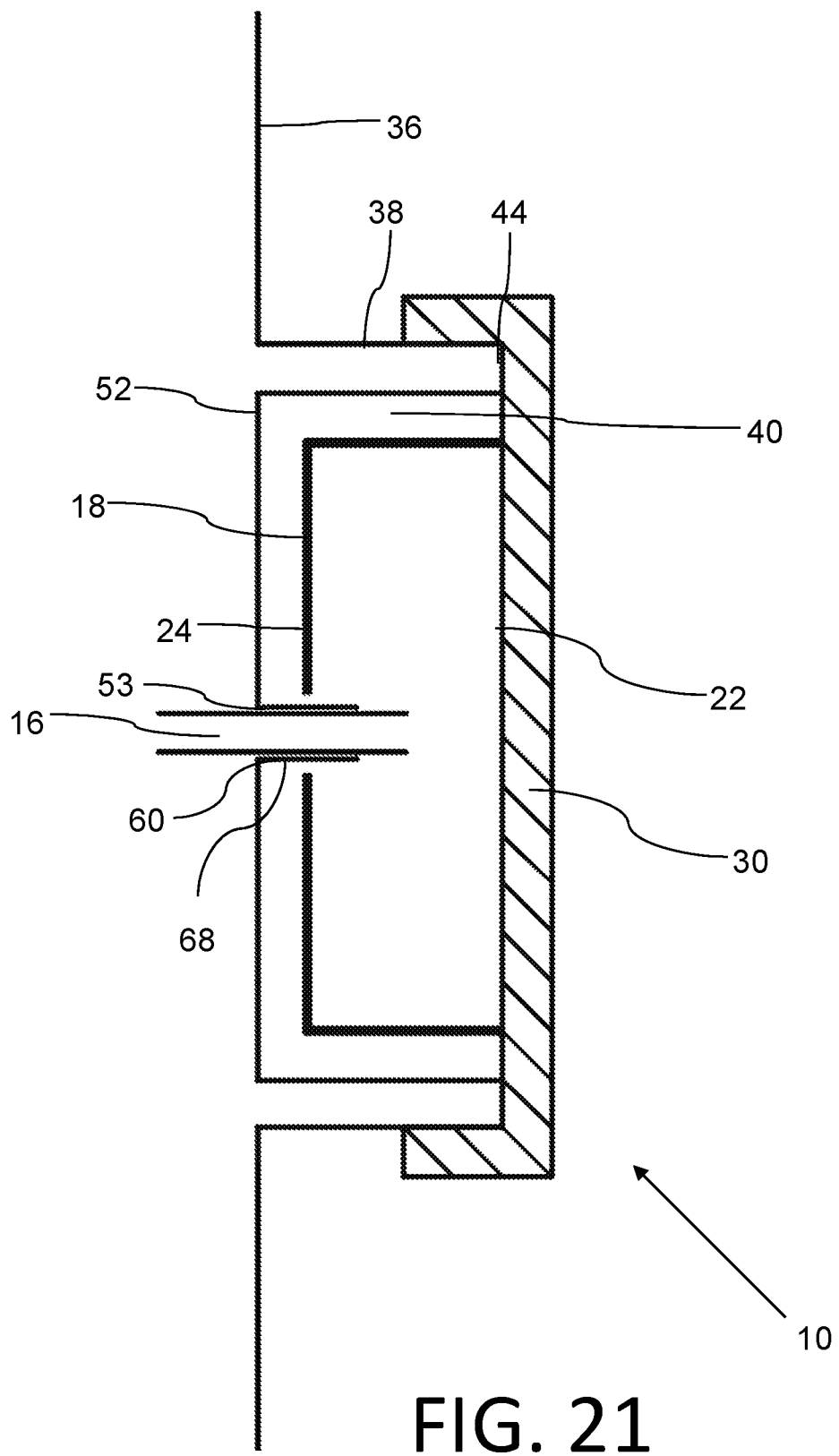
FIG. 21 is a side elevation view in cross section of a weatherproof enclosure with an interior protrusion formed in the rear wall and around the elongated member after the cover plate has been attached.
Figure 31:
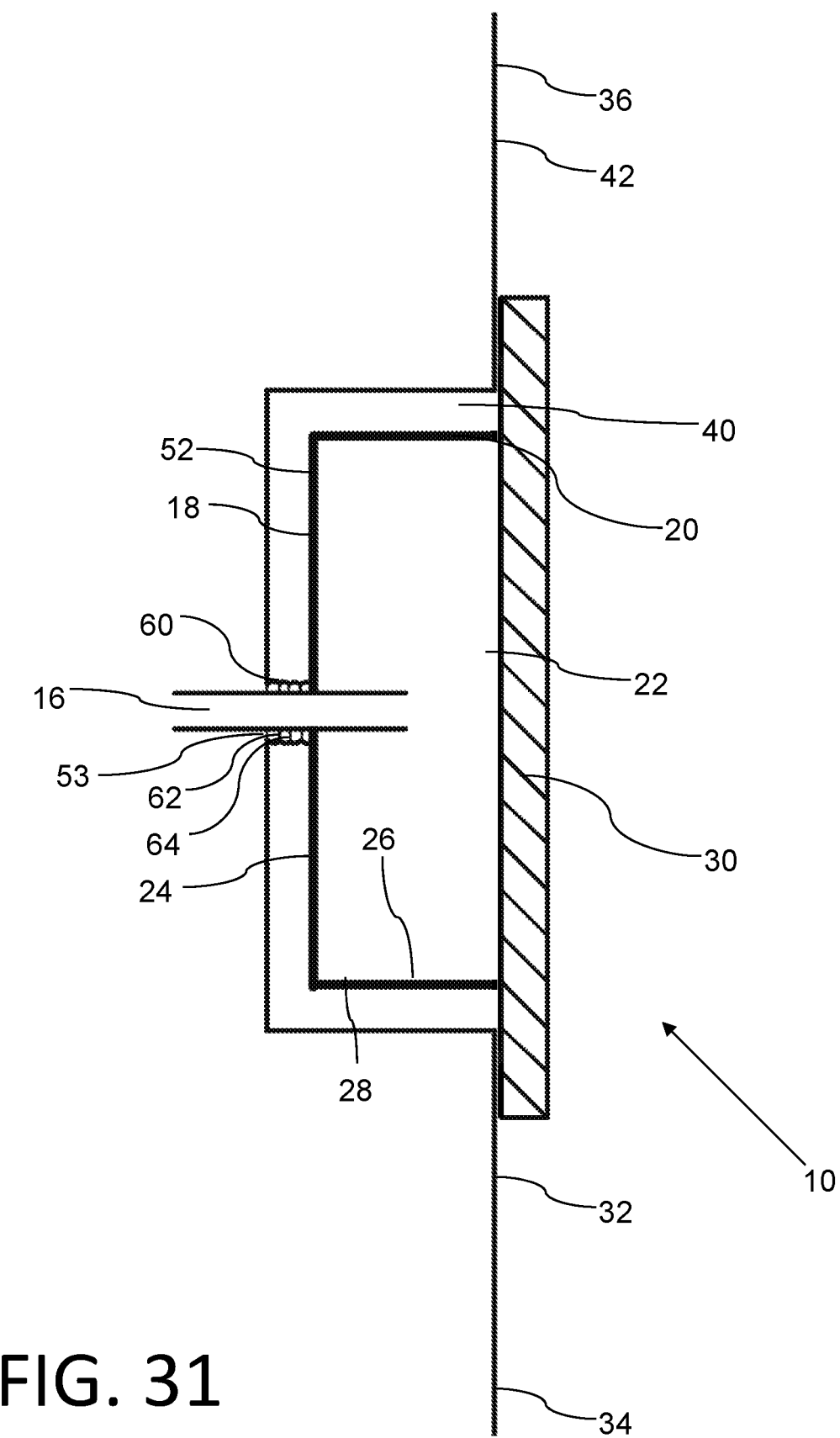
FIG. 31 is a side elevation view in cross section of a weatherproof enclosure without a flange and with a collapsible protrusion formed in the rear wall and around the elongated member after the cover plate has been attached

Referring to FIGS. 11-14 and FIGS. 17-19, an interior seal 60 may be positioned within junction box receiving area 40. Interior seal 60 has an aperture that receives an elongate member 16 such as a cable passing from the interior of the building to junction box 18. Interior seal 60 may sealingly engage closed end 24 of junction box 18 to form a seal around elongate member 16. It will be understood that interior seal 60 may be provided in combination with the seal formed by top peripheral edge 44 and cover plate 30, or interior seal 60 may be provided instead of this seal formed between flange 38 and cover plate 30. For example, in situations where cover plate 30 is not desired, or where space constraints are such that a seal cannot be formed between flange 38 and cover plate 30, interior seal 60 may be provided to prevent moisture from passing through weather barrier 32 into the building. Interior seal 60 may be formed from a deformable material that deforms against closed end 24 of junction box 18 when cover plate 30 is installed on junction box 18. For example, as shown in FIGS. 11 and 12, interior seal 60 may be formed from a collapsible protrusion 62 formed in rear wall 52 that collapses against closed end 24 of junction box 18 to form a seal. As shown in FIGS. 17 and 18, elongate member 16 may be passed through collapsible protrusion 62 before it is collapsed to form a seal against elongate member 16. Interior seal 60 may also be formed from a sealing material that seals against closed end 24 of junction box 18, such as an o-ring seal, rubber washer, foam layer, or other types of seals that are known in the art. Interior seal 60 may seal against closed end 24 of junction box 18, such as in FIG. 13 and FIG. 24, or it may form the seal directly around elongate member 16, such as in FIG. 19. As shown in FIGS. 14 and 17, interior seal 60 may be a protrusion 64 through which elongate member 16 may pass. Protrusion 64 may be sized to form a friction fit seal against elongate member 16, or protrusion 64 may be resilient and deform as elongate member 16 passes through in order to form a seal. Protrusion 64 may also compress against junction box 18 to form a seal, as shown in FIG. 17, FIG. 18, and FIG. 31. Referring to FIG. 20 and FIG. 21, interior seal 60 may also be formed by a collar 68 that seals against elongate member 16 as it passes through rear wall 52 and extends into junction box 18. Collar 68 may be used in isolation to form a seal, in which case junction box 18 may fit loosely around collar 68, or collar 68 may be used in combination with other seals as described above. When the seal is not formed with junction box 18, it will be understood that collar 68 may either extend away from the building, as shown in FIG. 20 and FIG. 21, or collar 68 may extend toward the building, as shown in FIG. 22, or at other angles as will be understood by those skilled in the art.

Figure 25:
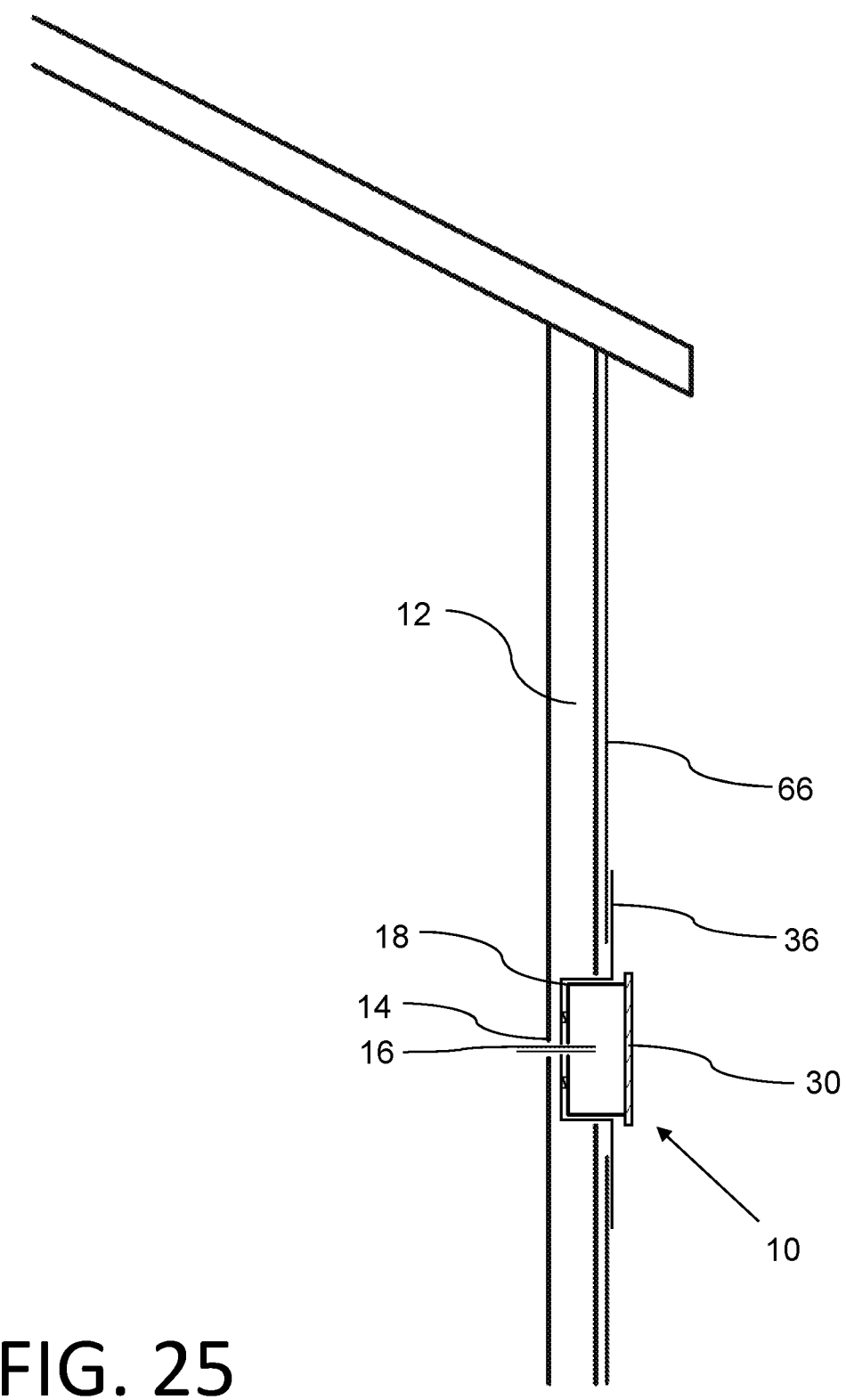
FIG. 25 is a side elevation view in cross section of an alternative weatherproof enclosure for a junction box installed in an exterior wall of a building.
Figure 26:
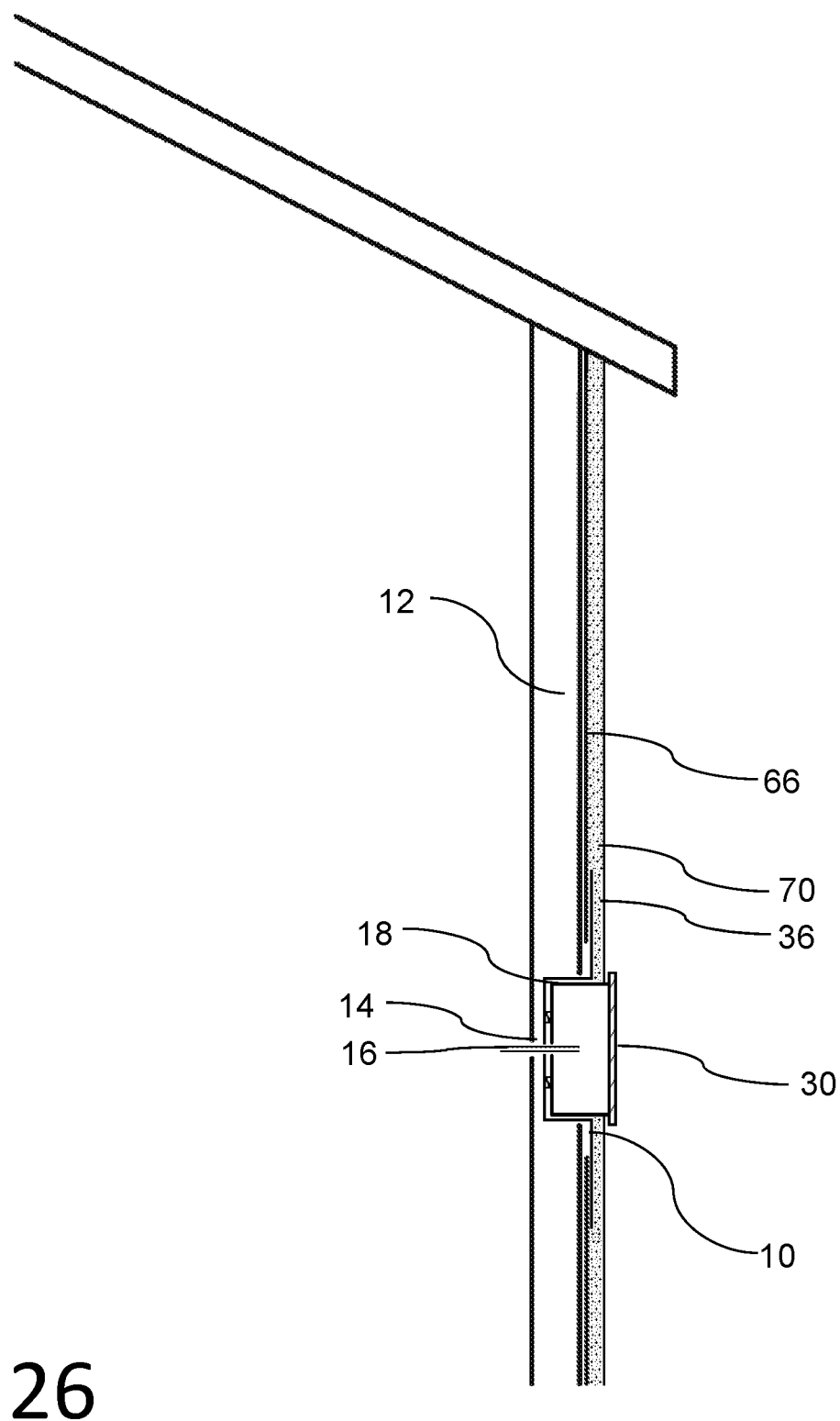
FIG. 26 is a side elevation view in cross section of a weatherproof enclosure for a junction box installed in an exterior wall of a building with siding material installed.

A method of installing weatherproof enclosure 10 will now be described. Referring to FIG. 1, a hole 14 is formed in wall 12 for junction box 18 to be installed in or to pass through. Cables or other tubulars 16 are run from the interior of the building through wall 12 into junction box 18. Depending on the direction that weather barrier 32 will engage with junction box 18, weather barrier 32 may either be installed prior to installation of junction box 18, such that junction box 18 can be inserted into junction box receiving area 40 from first face 42 of wall cover portion 36. Alternatively, weather barrier 32 may be installed after junction box 18, such that weather barrier 32 is placed over junction box 18 to place junction box 18 into junction box receiving area 40. As discussed above, a seal is formed by weather barrier 32, either in combination with cover plate 30, or interior seal 60, or both seals may be formed. When the seal is formed with cover plate 30, cover plate 30 is connected to junction box 18 after junction box 18 and weather barrier 32 are installed, and cover plate 30 engages and forms a seal with top peripheral edge 44 of flange 38 when cover plate 30 is connected. Alternatively, when the seal is formed with interior seal 60, the seal may be formed as weather barrier 32 is installed over the cable or other tubular that forms elongate member 16, or the seal may be formed against junction box 18 as it is installed against interior seal 60. Interior seal 60 may be integrally formed with rear wall 52, or may be a separate component that is installed between rear wall 52 and junction box 18. Cover plate 30 may then be installed over junction box 18, which may create pressure to form a seal between junction box 18 and interior seal 60, or cover plate 30 may be installed without affecting weather barrier 32. As discussed above, where the seal is formed with interior seal 60, cover plate 30 may also not be provided. Weather barrier 32 may be installed on a wall that is already covered in a building wrap material 66, or a building wrap material 66 may be provided after installation of weather barrier 32. Referring to FIG. 1 and FIG. 25, it will be understood that weatherproof enclosure 10 and weather barrier 32 may be installed over or under building wrap material 66. As is known in the art, building wrap material may overlap with weather barrier 32, and they may be taped or otherwise attached together to form a seal and a continuous weatherproof surface. Referring to FIG. 26, building siding material 70, such as stucco or other siding materials, may be installed over weatherproof enclosure 10 and building wrap material 66 to finish the wall surface, as is known in the art.

Figure 22:
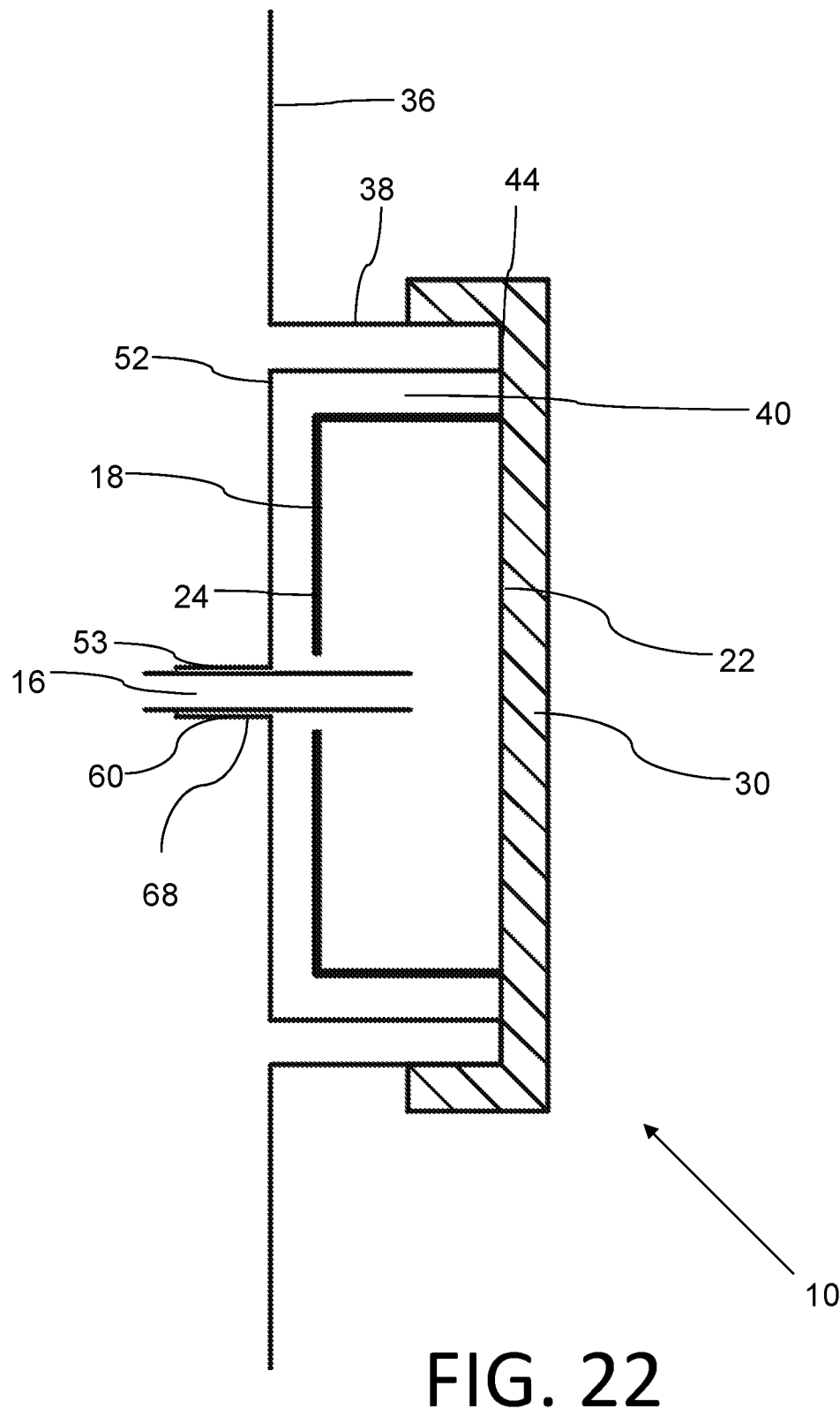
FIG. 22 is a side elevation view in cross section of a weatherproof enclosure with a protrusion formed in the rear wall and around the elongated member that protrudes away from the enclosure after the cover plate has been attached.

Referring to FIG. 20-22, the weatherproof enclosure 10 may also be formed with a seal around elongate member 16 instead of or in addition to a seal against junction box 18. Referring to FIG. 19, interior seal 60 may be formed around elongate member 16 and extend through an opening into junction box 18, or, referring to FIG. 22, interior seal 60 may extend away from junction box 18. As discussed above, the seal may also be formed at different angles. Elongate member 16 passes through opening 14 in wall 12 to extend into junction box 18. Interior seal 60 is positioned within the perimeter of flange 38, and has an aperture that receives and seals around elongate member 16. It will be understood that the seal may be formed by a friction fit between elongate member 16 and interior seal 60, or interior seal 60 may be formed from a resilient material and the aperture may have a smaller diameter than the diameter of elongate member 16, or other sealing methods may be used as are known in the art.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A weather-protected enclosure, comprising:
    a junction box having a sidewall that extends between an open end and a closed end, the sidewall having an inner surface and an outer surface;
    a cover plate that is removably installed on the junction box, the cover plate being sized to cover the open end of the junction box; and
    a weather barrier, comprising:
        a sheet made from non-permeable material, the sheet comprising a wall cover portion that surrounds a flange, the flange defining a junction box receiving area, the flange protruding from a first face of the wall cover portion and terminating in a top peripheral edge, wherein the junction box is positioned within the junction box receiving area such that the flange surrounds the junction box and the top peripheral edge extends beyond the open end of the junction box relative to the closed end;
        wherein the cover plate engages and forms a seal with the top peripheral edge of the flange such that the seal surrounds and is entirely outside the outer surface of the sidewall when the cover plate is installed on the junction box, the seal being formed by compressing and deforming resilient material of the flange.

2. The weather-protected enclosure of claim 1, wherein, in a plane parallel to the wall cover portion of the sheet, the junction box receiving area has a cross-sectional area that is greater than a cross-sectional area of the junction box.

3. The weather-protected enclosure of claim 1, wherein the flange extends past the open end of the junction box relative to the closed end.

4. The weather-protected enclosure of claim 3, wherein the flange is made from a deformable material that deforms when the cover plate is installed on the junction box.

5. The weather-protected enclosure of claim 1, wherein the cover plate carries a sealing material that seals against the top peripheral edge of the flange when the cover plate is installed on the junction box.

6. The weather-protected enclosure of claim 1, wherein the flange is continuously and integrally formed with the wall cover portion from the same material, the material of the flange and the wall cover portion having the same material properties.

7. The weather-protected enclosure of claim 1, wherein the flange comprises a double-walled structure that surrounds and is outside the outer surface of the sidewall.

8. The weather-protected enclosure of claim 1, wherein the flange is corrugated.

9. The weather-protected enclosure of claim 1, wherein the junction box receiving area has a rear wall opposite the top peripheral edge of the flange.

10. The weather-protected enclosure of claim 1, wherein the flange further comprises a double-walled structure that has a first end connected to the top peripheral edge, the double-walled structure comprising a telescoping wall that is positioned within the junction box receiving area and extends rearward relative to the top peripheral edge, such that, when the junction box is inserted into the junction box receiving area from a rear surface of the wall cover portion toward the top peripheral edge of the flange, the telescoping wall engages and moves with the open end of the junction box.

11. The weather-protected enclosure of claim 1, further comprising an interior seal positioned within the junction box receiving area and comprising an aperture that receives an elongate member, the interior seal sealingly engaging the closed end of the junction box and sealing around the elongate member.

12. A weather-protected enclosure, comprising:
    a junction box having a sidewall that extends between an open end and a closed end, the sidewall having an inner surface and an outer surface; and
    a weather barrier, comprising:
        a sheet made from non-permeable material, the sheet comprising a wall cover portion that surrounds a flange, wherein:
            the flange defines a junction box receiving area, the flange having a first end connected to the wall cover portion such that the flange protrudes from a first face of the wall cover portion and a top peripheral edge spaced from the first end;
            the junction box is positioned within the junction box receiving area such that the flange surrounds the junction box and the top peripheral edge extends toward the open end of the junction box; and
            the flange comprises an outer wall and a telescoping wall that is positioned within the junction box receiving area relative to the outer wall, the top peripheral edge connecting the outer wall and the telescoping wall such that the top peripheral edge surrounds and is entirely outside the outer surface of the sidewall of the junction box, the telescoping wall comprising a double-walled structure having a folded edge spaced from the top peripheral edge such that, when the junction box is inserted into the junction box receiving area from a rear surface of the wall cover portion toward the top peripheral edge of the flange, the telescoping wall engages and moves with the open end of the junction box such that the folded edge moves toward the top peripheral edge as the top peripheral edge remains stationary.

* * * * *